United States Patent
Takemura et al.

(10) Patent No.: US 12,448,741 B2
(45) Date of Patent: Oct. 21, 2025

(54) SEISMIC REINFORCEMENT DEVICE FOR BRIDGE

(71) Applicants: SHO-BOND CORPORATION, Tokyo (JP); BRIDGE BEARING MANUFACTURE CO., LTD., Tokyo (JP)

(72) Inventors: Hiroshi Takemura, Tokyo (JP); Yuki Andoh, Tokyo (JP); Yoshisato Hiratsuka, Tokyo (JP); Hironori Ogura, Tokyo (JP); Yuichi Goda, Tokyo (JP)

(73) Assignees: SHO-BOND CORPORATION, Tokyo (JP); BRIDGE BEARING MANUFACTURE CO., LTD., Tokyo (JP)

( * ) Notice: Subject to any disclaimer, the term of this patent is extended or adjusted under 35 U.S.C. 154(b) by 112 days.

(21) Appl. No.: 17/791,876

(22) PCT Filed: Dec. 22, 2021

(86) PCT No.: PCT/JP2021/047596
§ 371 (c)(1),
(2) Date: Jul. 8, 2022

(87) PCT Pub. No.: WO2022/209066
PCT Pub. Date: Oct. 6, 2022

(65) Prior Publication Data
US 2024/0141603 A1    May 2, 2024

(30) Foreign Application Priority Data
Mar. 30, 2021    (JP) .................................. 2021-057478

(51) Int. Cl.
*E01D 19/04*    (2006.01)

(52) U.S. Cl.
CPC .................................. *E01D 19/042* (2013.01)

(58) Field of Classification Search
CPC ....... E01D 19/042; E01D 19/04; E01D 19/041; E01D 19/048
See application file for complete search history.

(56) References Cited

U.S. PATENT DOCUMENTS

2010/0319271 A1* 12/2010 Sarraf .................... E01D 19/02
                                                    52/701
2019/0145066 A1*  5/2019 Kochiyama ............ F16F 15/04
                                                    52/167.7

(Continued)

FOREIGN PATENT DOCUMENTS

CN    104652253 A      5/2015
CN    106436558 A  *   2/2017

(Continued)

OTHER PUBLICATIONS

International Search Report (ISR) dated Mar. 22, 2022, issued in International Application No. PCT/JP2021/047596.

(Continued)

*Primary Examiner* — Abigail A Risic
(74) *Attorney, Agent, or Firm* — Holtz, Holtz & Volek PC

(57) ABSTRACT

A seismic reinforcement device for a bridge includes a first member having a projecting portion and a second member having a depressed portion. The device has a horizontal force sharing function in which the projecting and the depressed portions are freely fitted to and engaged with one another to constitute a shear key and resist a horizontal force by causing the first member to be coupled to and supported by any one of the substructure and the superstructure and causing the second member to be coupled to and supported by the other of the substructure and the superstructure. In addition, the device has a level difference preventive function that suppresses dropping of the superstructure and (Continued)

reduces a level difference of the substructure and the superstructure by interposing a spacer having a predetermined thickness between the first and second members or between the substructure or the superstructure and the device.

13 Claims, 17 Drawing Sheets

(56) References Cited

U.S. PATENT DOCUMENTS

2019/0194883 A1* 6/2019 Yang .......................... E01D 1/00
2021/0319685 A1* 10/2021 Mancini ................. G08B 21/18

FOREIGN PATENT DOCUMENTS

| | | | |
|---|---|---|---|
| JP | H08239808 A | | 9/1996 |
| JP | H08277506 A | | 10/1996 |
| JP | 2000274484 A | | 10/2000 |
| JP | 3623005 B2 | * | 2/2005 |
| JP | 2006089939 A | * | 4/2006 |
| JP | 2006195713 A | * | 7/2006 |
| JP | 2007332665 A | * | 12/2007 |
| JP | 2008115639 A | * | 5/2008 |
| JP | 2019138094 A | | 8/2019 |
| JP | 2021038558 A | | 3/2021 |

OTHER PUBLICATIONS

Written Opinion dated Mar. 22, 2022, issued in International Application No. PCT/JP2021/047596.

* cited by examiner

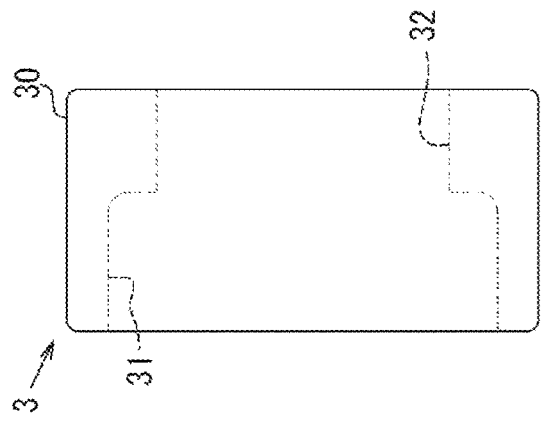
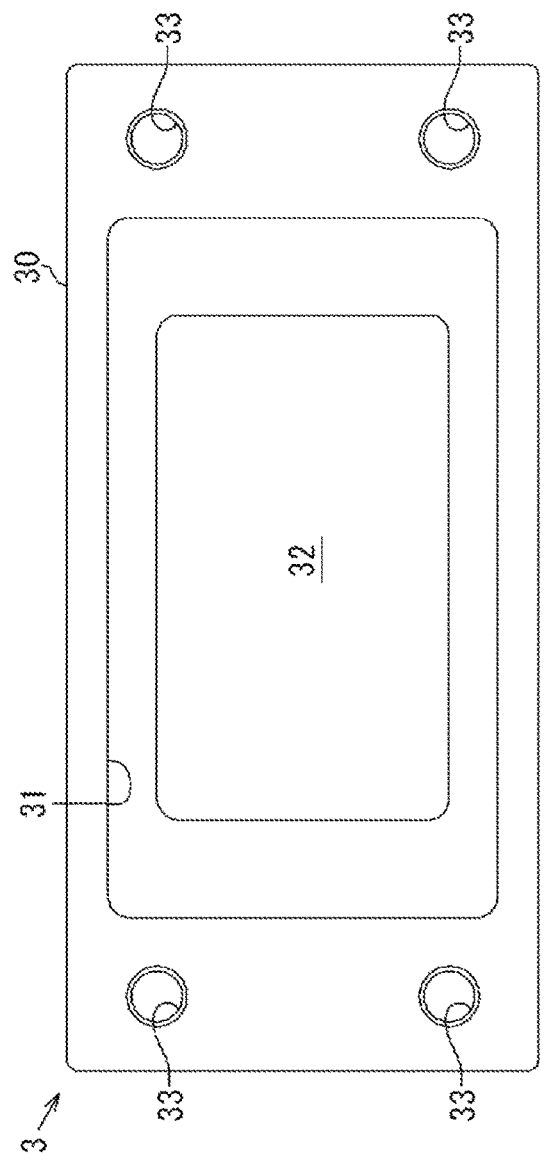
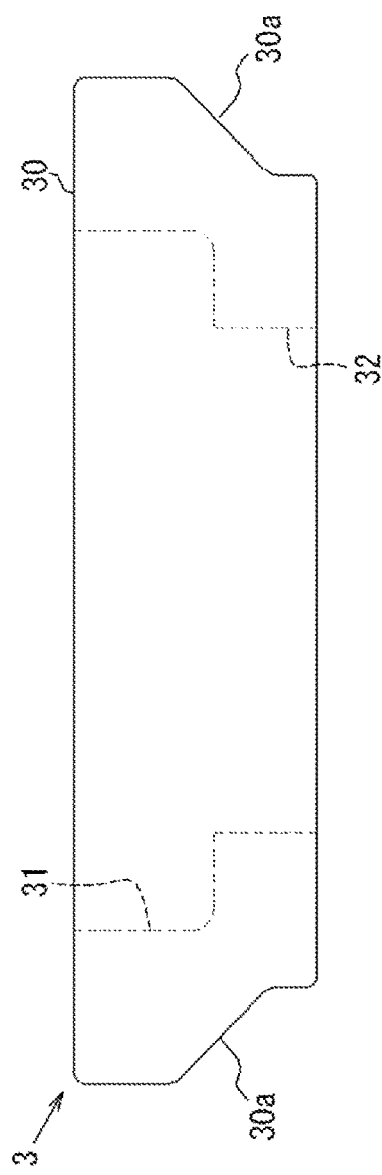

SEISMIC REINFORCEMENT DEVICE FOR BRIDGE

TECHNICAL FIELD

The present invention relates to a seismic reinforcement device for a bridge, and more specifically, relates to a seismic reinforcement device for a bridge that has a combination of a horizontal force sharing function and a level difference preventive function.

BACKGROUND ART

Conventionally, as seismic reinforcement for reinforcing already-existing bearings designed as the type A specified in Specifications for Highway Bridges 2002 to be able to withstand a level 2 earthquake motion, it has been required to additionally install a horizontal force sharing structure and a level difference preventive structure.

The horizontal force sharing structure is a seismic reinforcement structure (device) for the already-existing bearings required from the aspect of ensuring safety against collapse of bridges. However, for the seismic reinforcement of the already-existing bearings in recent years, it is required to separately install the level difference preventive structure in addition to the horizontal force sharing structure so that emergency vehicles and the like can pass even when the bearing height is high and thus the horizontal force sharing structure is broken by the action of a seismic force of level 2 earthquake motion or more (see Specifications for Highway Bridges 2012, an administrative circular from Road Bureau of Ministry of Land, Infrastructure, Transport and Tourism on Dec. 18, 2012, an administrative circular from Road Bureau of Ministry of Land, Infrastructure, Transport and Tourism on Jun. 25, 2015, and the like). That is, the level difference preventive structure is required to ensure at least a function of an evacuation route and a transportation route for rescue, relief, medical, and fire fighting activities and emergency supplies as a bearing structure against the seismic force of level 2 earthquake motion or more.

As the horizontal force sharing structure, for example, in Patent Document 1, an upward lift coping type structure displacement limiting stopper device is disclosed. The upward lift coping type structure displacement limiting stopper device described in Patent Document 1 is a device provided between a substructure 6 including a bearing and a superstructure 7 above the substructure 6. A locking upward projection 2 is provided on a first stopper member 1 secured to the substructure 6. A locking downward opening depressed portion 4 is provided on a second stopper member 3 secured to the superstructure 7. The upward projection 2 is arranged in the downward opening depressed portion 4. A member is joined to the upper portion of the locking upward projection 2 on the first stopper member 1 by screw joint to provide an outward flange 27 projecting out laterally. An inward flange projecting out to the inside of the locking downward opening depressed portion 4 at a level lower than an outward flange 27 is provided at the lower end portion of the second stopper member 3. The width dimension in a bridge axis-perpendicular direction of the outward flange 27 is set larger than the width dimension between inner wall surfaces of the inward flange 28 (see the claim 1 of Patent Document 1, paragraphs [0009] to [0031] of the description, FIG. 1 and FIG. 2 of the drawings, and the like).

However, the upward lift coping type structure displacement limiting stopper device of Patent Document 1 does not have a level difference preventive function, and it is necessary to provide a level difference preventive structure separately.

As a level difference preventive structure, a level difference preventive device is disclosed in Patent Document 2. The level difference preventive device 1 described in Patent Document 2 internally has a storage portion 12, has an opening 13 for adding a filler into the storage portion 12 at an upper portion, and includes a main body 10 that can be secured to the upper portion of a bridge pier and a lid portion 20 that covers the opening 13 (see the claim 1 of Patent Document 2, paragraphs [0015] to [0022] of the description, FIG. 1 to FIG. 3 of the drawings, and the like).

However, the level difference preventive device described in Patent Document 2 does not have a horizontal force sharing function, and it is necessary to provide a horizontal force sharing structure separately.

As described above, both the upward lift coping type structure displacement limiting stopper device of Patent Document 1 and the level difference preventive device described in Patent Document 2 are devices on the premise of being installed individually. When there is no space around a bearing, it is necessary to expand with a bracket and the like from a lower structure for installing the respective devices, which causes a problem that the cost increases. Further, in some cases, since there is no room for the bracket and the like to project out from the lower structure, it is originally extremely difficult to make space for installing these two devices. In addition, even when the space for installing the two devices can be taken, the situation around the bearing becomes extremely complicated, which causes a problem that maintenance and management of these devices may be impeded.

Patent Document 1: JP-A-2008-115639
Patent Document 2: JP-A-2019-138094

DISCLOSURE OF THE INVENTION

Problems to be Solved by the Invention

Therefore, the present invention has been invented in consideration of the above-described problems and an object of the present invention is to provide a seismic reinforcement device for a bridge that has a combination of a horizontal force sharing function and a level difference preventive function and is configured to be installed with a small space.

Solutions to the Problems

A seismic reinforcement device for a bridge according to a first aspect of the invention is to be added between a substructure and a superstructure of an already-existing bridge to increase a seismic capacity, and the seismic reinforcement device for a bridge includes a first member having a projecting portion and a second member having a depressed portion. The seismic reinforcement device for a bridge has: a horizontal force sharing function in which the projecting portion and the depressed portion are freely fitted to and engaged with one another to constitute a shear key and resist a horizontal force by causing the first member to be coupled to and supported by any one of the substructure and the superstructure and causing the second member to be coupled to and supported by the other of the substructure and the superstructure; and a level difference preventive function that suppresses dropping of the superstructure and reduces a level difference of the substructure and the superstructure by interposing a spacer having a predetermined thickness between the first member and the second member or between the substructure or the superstructure and the seismic reinforcement device.

In the seismic reinforcement device for a bridge according to a second aspect of the invention, which is a further aspect of the seismic reinforcement device according to the first aspect of the invention, the spacer includes a rubber elastic body in part or is a buffer material made of a rubber elastic body in whole.

In the seismic reinforcement device for a bridge according to a third aspect of the invention, which is a further aspect of the seismic reinforcement device according to the second aspect of the invention, the spacer substitutes for a part of a bearing function in an emergency.

In the seismic reinforcement device for a bridge according to a fourth aspect of the invention, which is a further aspect of the seismic reinforcement device according to any one of first to third aspects of the invention, the spacer is joined to a distal end of the projecting portion.

In the seismic reinforcement device for a bridge according to a fifth aspect of the invention, which is a further aspect of the seismic reinforcement device according to the fourth aspect of the invention, the first member includes a disk-shaped additional flange that covers and is secured to an upper end of the projecting portion, and the spacer is joined to an upper surface of the additional flange.

In the seismic reinforcement device for a bridge according to a sixth aspect of the invention, which is a further aspect of the seismic reinforcement device according to the fourth aspect of the invention, the spacer is mechanically fastened, adhered with an elastic adhesive, or vulcanized and adhered, to an upper end surface of the projecting portion.

A seismic reinforcement device for a bridge according to a seventh aspect of the invention, which is a further aspect of the seismic reinforcement device according to the fourth aspect of the invention, includes a second spacer made of a rubber elastic body. The first member is mounted via the second spacer, and the second spacer substitutes for a part of a bearing function in an emergency.

A seismic reinforcement device for a bridge according to an eighth aspect of the invention, which is a further aspect of the seismic reinforcement device according to the seventh aspect of the invention, includes a rod that restrains a horizontal displacement of the first member is provided.

A seismic reinforcement device for a bridge according to a ninth aspect of the invention, which is a further aspect of the seismic reinforcement device according to any one of the first to eighth aspects of the invention, further includes an upper adjusting plate according to an inclination of the superstructure.

In the seismic reinforcement device for a bridge according to a tenth aspect of the invention, which is a further aspect of the seismic reinforcement device according to the ninth aspect of the invention, the upper adjusting plate has a lower surface on which a depressed portion for keeping from interfering with the spacer is formed.

In the seismic reinforcement device for a bridge according to an eleventh aspect of the invention, which is a further aspect of the seismic reinforcement device according to the fourth aspect of the invention, the first member includes a shoulder portion projecting out to an outside, and the shoulder portion abuts on a lower surface of the additional flange in a state where the additional flange abuts on an upper surface of the projecting portion.

Effects of the Invention

With the seismic reinforcement device for a bridge according to the first to eleventh aspects of the present invention, since the horizontal force sharing function and the level difference preventive function can be used in combination, a narrow space around a bearing can be effectively utilized to reduce an installation cost. With the seismic reinforcement device for a bridge according to the first to ninth aspects of the invention, a seismic reinforcement device for a bridge that has a combination of the horizontal force sharing function and the level difference preventive function can be provided even when there is no room for a bracket and the like to project out from a lower structure. In addition, with the seismic reinforcement device for a bridge according to the first to ninth aspects of the invention, maintenance and management of the device becomes easy even in the narrow space around the bearing, and a trouble can be promptly discovered and dealt with.

Especially with the seismic reinforcement device for a bridge according to the second and third aspects of the invention, since the spacer is a buffer material at least including a rubber elastic body, a buffering effect is provided against dropping of a main girder at the time of an earthquake and passing by emergency vehicles, the main girder and the substructure are less likely to be damaged, and restorability of the bridge is improved.

Especially with the seismic reinforcement device for a bridge according to the fourth aspect of the invention, since the spacer is joined to the upper end of the projecting portion, the spacer does not interfere when the first member and the second member operate and relatively horizontally move, and the level difference preventive function does not possibly hinder the horizontal force sharing function.

Especially with the seismic reinforcement device for a bridge according to the fifth aspect of the invention, a shear force of the plate thickness of the additional flange having a lid structure and a dispersing function of the spacer allow for supporting a dead load of an upper structure, and the level difference preventive function can be exerted.

Especially with the seismic reinforcement device for a bridge according to the sixth aspect of the invention, the additional flange and the spacer can be strongly joined. In view of this, the dispersing function of the spacer allows for supporting the dead load of the upper structure, and the level difference preventive function can be exerted.

Especially with the seismic reinforcement device for a bridge according to the seventh aspect of the invention, the second spacer made of a rubber elastic body substitutes for a part of the bearing function in an emergency, and the dropped upper structure can be safely supported.

Especially with the seismic reinforcement device for a bridge according to the eighth aspect of the invention, a rod can restrain the first member from shifting in a horizontal direction.

Especially with the seismic reinforcement device for a bridge according to the ninth aspect of the invention, the seismic reinforcement device for a bridge can be horizontally installed irrespective of the inclination of the superstructure.

Especially with the seismic reinforcement device for a bridge according to the tenth aspect of the invention, the spacer and the additional flange can be increased in thickness to improve the bearing function in an emergency. Further, with the seismic reinforcement device for a bridge according to the tenth aspect of the invention, even when the spacer and the additional flange are increased in thickness, respective members of a conventional seismic reinforcement device having only the horizontal force sharing function can be directly used. In view of this, a production cost can be reduced.

Especially with the seismic reinforcement device for a bridge according to the eleventh aspect of the invention, when the superstructure drops and the level difference preventive function is exerted, a screw portion of the additional flange being damaged by an impact force of the dropping can be avoided by hooking the additional flange on the shoulder portion.

BRIEF DESCRIPTION OF THE DRAWINGS

FIG. 4 are drawings illustrating only a first member of the same seismic reinforcement device as above.

FIG. 5 are drawings illustrating only a second member of the same seismic reinforcement device as above. FIG. 5A is a front view, FIG. 5B is a plan view, and FIG. 5C is a right side view.

DESCRIPTION OF PREFERRED EMBODIMENTS

The following describes in detail a seismic reinforcement device for a bridge according to embodiments of the present invention with reference to the drawings.

First Embodiment

First, using FIG. 1 to FIG. 8, a seismic reinforcement device for a bridge according to a first embodiment of the present invention will be described. The seismic reinforcement will be described by exemplifying a case where a general type A bridge B1 specified in Specifications for Highway Bridges 2002 where a concrete floor slab S1 is installed on a steel girder G2 as a superstructure G1 is reinforced against earthquakes to a level equal to or more than type B specified in Specifications for Highway Bridges 2002 (the same applies below).

Figure 1:
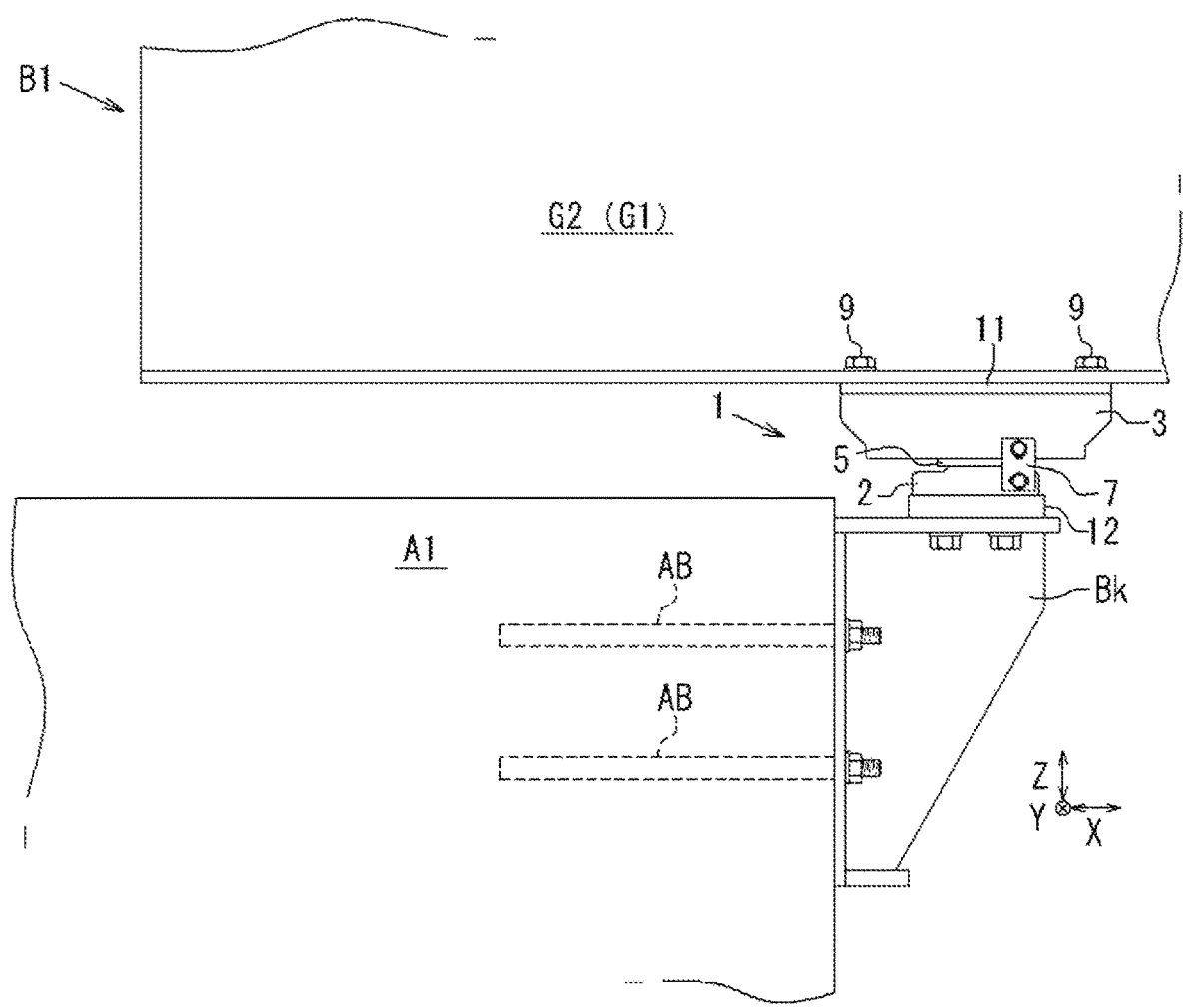
FIG. 1 is a partially enlarged side view illustrating a seismic reinforcement device for a bridge according to a first embodiment of the present invention and a bridge as viewed in a bridge axis-perpendicular direction.
Figure 2:
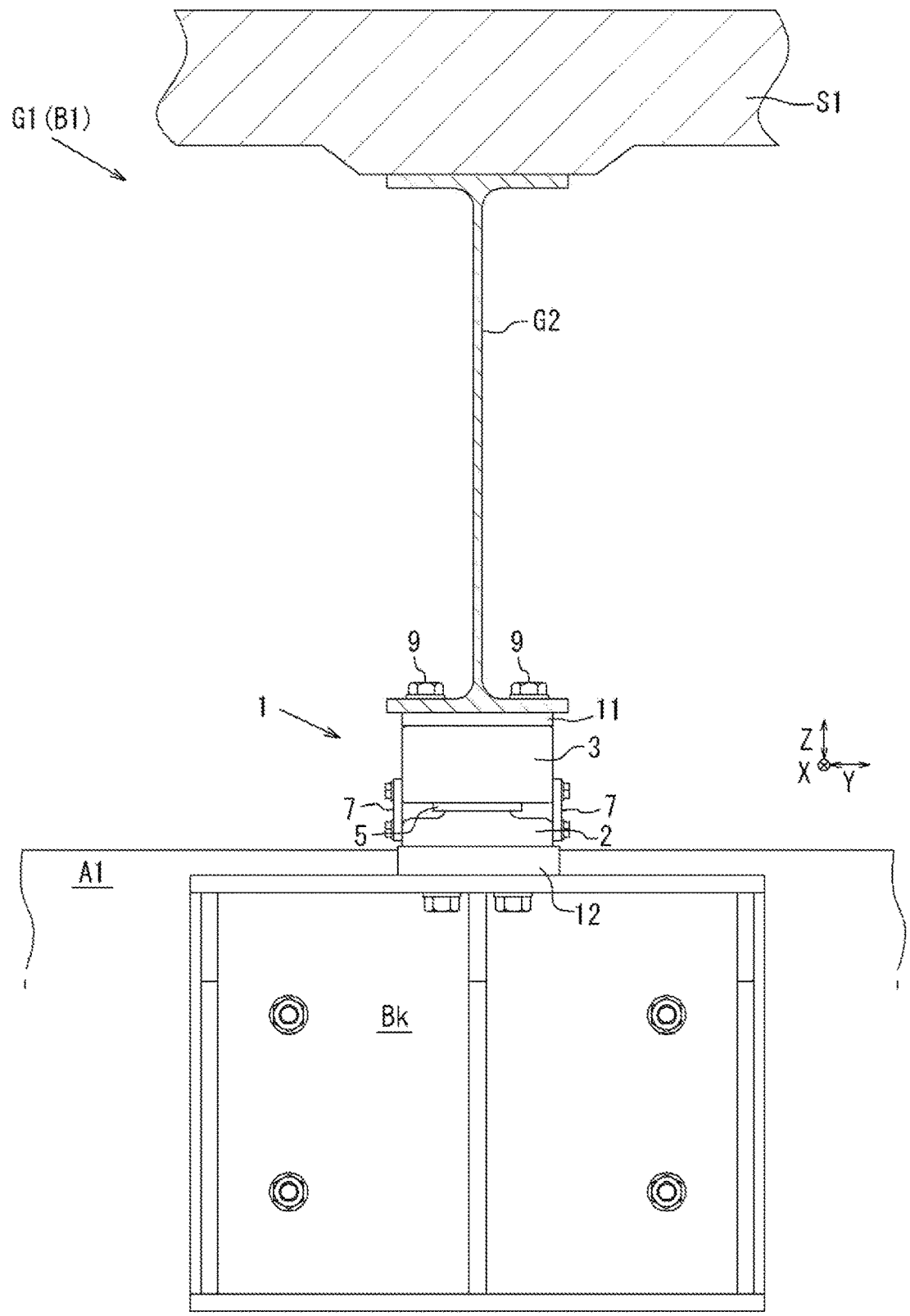
FIG. 2 is a vertical cross-sectional view illustrating the bridge as viewed in a bridge axis direction in a state where the same seismic reinforcement device for a bridge as above and a superstructure are vertically cut off.
Figure 3:
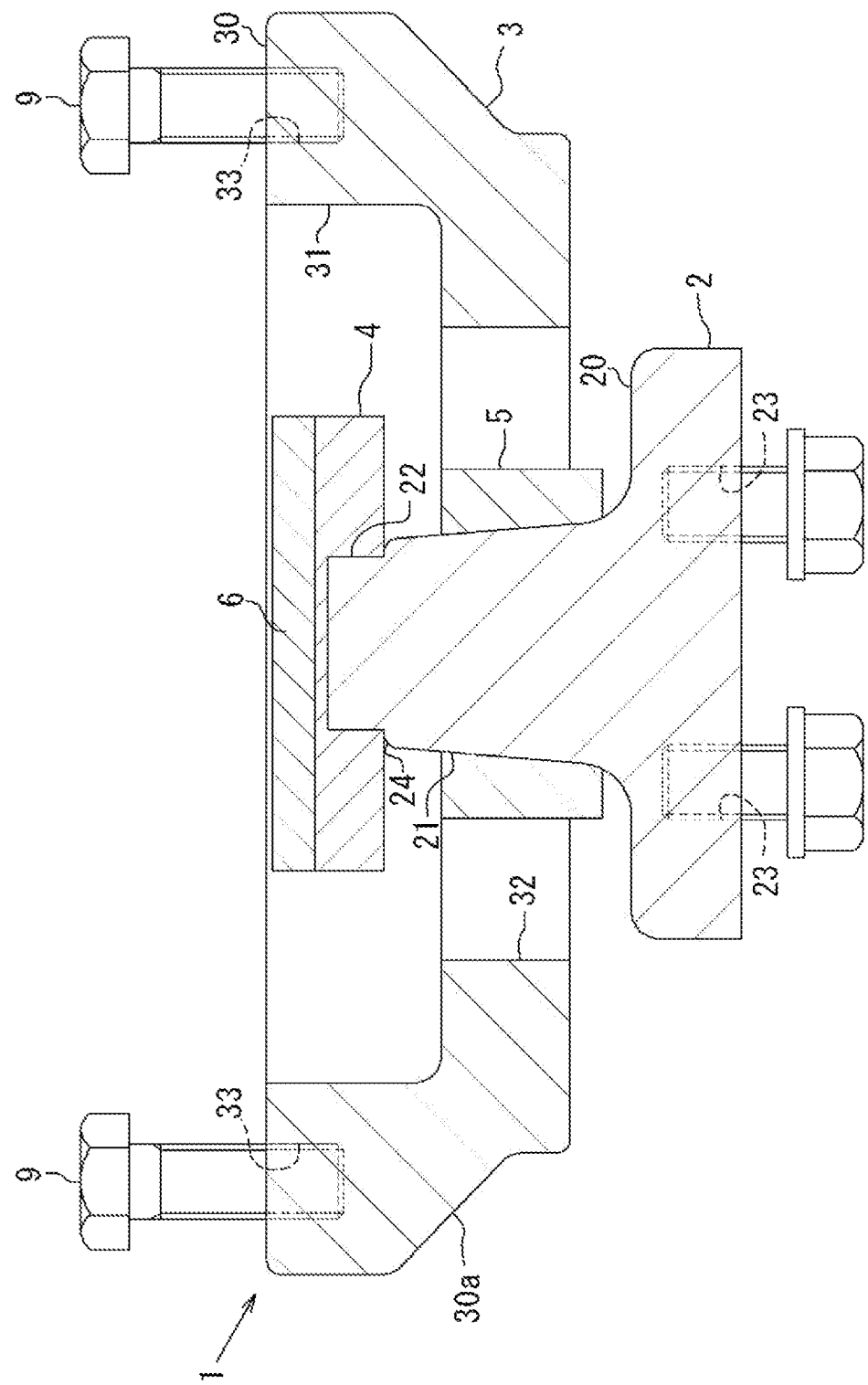
FIG. 3 is a vertical cross-sectional view illustrating the same seismic reinforcement device for a bridge as above in a state of being vertically cut off in the bridge axis direction.

FIG. 1 is a partially enlarged side view illustrating a seismic reinforcement device for a bridge 1 according to the first embodiment of the present invention and the bridge B1 as viewed in a bridge axis-perpendicular direction. FIG. 2 is a vertical cross-sectional view illustrating the bridge B1 as viewed in a bridge axis direction in a state where the seismic reinforcement device for a bridge 1 and the superstructure G1 are vertically cut off. FIG. 3 is a vertical cross-sectional view illustrating the seismic reinforcement device for a bridge 1 in a state of being vertically cut off in the bridge axis direction. A reference numeral X in the drawings denotes a bridge axis direction X of the bridge B1, and a reference numeral Y denotes a bridge axis-perpendicular direction Y of the bridge B1 (horizontal direction perpendicular to the bridge axis direction X). A reference numeral Z denotes an up-down direction.

As illustrated in FIG. 1 and FIG. 2, the seismic reinforcement device for a bridge 1 (hereinafter also simply referred to as a seismic reinforcement device 1) according to the first embodiment of the present invention is a seismic reinforcement device that is interposed between a substructure A1 and the superstructure G1 of the already-existing bridge B1 later at the time of a reinforcement work to reinforce a seismic capacity. In the illustrated configuration, the seismic reinforcement device 1 is described by exemplifying a case where a bracket Bk made of a steel material is provided to protrude on a side surface of the already-existing substructure A1 that is a bridge abutment using post-installed anchors AB and the seismic reinforcement device 1 is added on the bracket Bk. Surely, needless to say, when there is a space in the already-existing substructure A1 for installing the seismic reinforcement device 1, the seismic reinforcement device 1 may be directly installed in the substructure A1 using an anchor and the like.

As illustrated in FIG. 1 to FIG. 3, the seismic reinforcement device 1 includes a first member 2 and a second member 3. The first member 2 is coupled to and supported by the substructure A1 via the bracket Bk, and the second member 3 is directly coupled to and supported by the steel girder G2. With this, the seismic reinforcement device 1 has a horizontal force sharing function in which the first member 2 and the second member 3 are freely fitted and engaged to constitute a shear key and resist a horizontal force acting on the bridge B1. An upper adjusting plate 11 and a lower adjusting plate 12 are oblong metal plates, and the upper adjusting plate 11 is tapered to level a longitudinal inclination of the steel girder G2. Surely, needless to say, when the superstructure is a concrete girder, the seismic reinforcement device 1 may be installed by installing an appropriate anchor and the like.

(First Member)

Figure 4A:
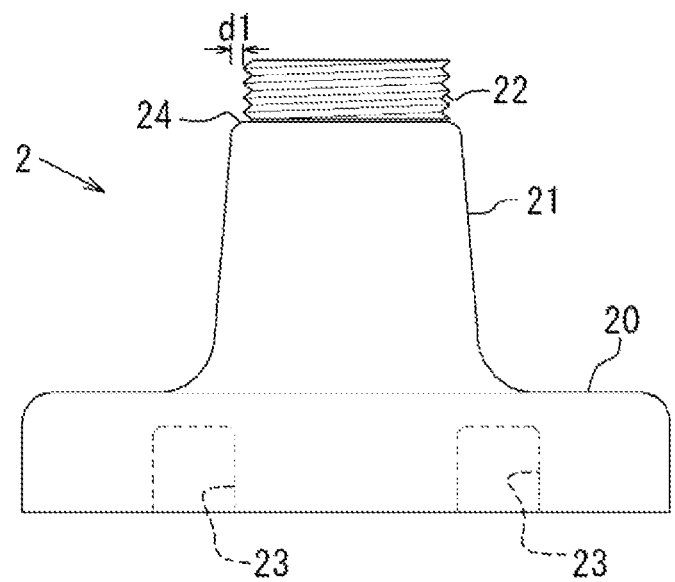
FIG. 4A is a front view.
Figure 4B:
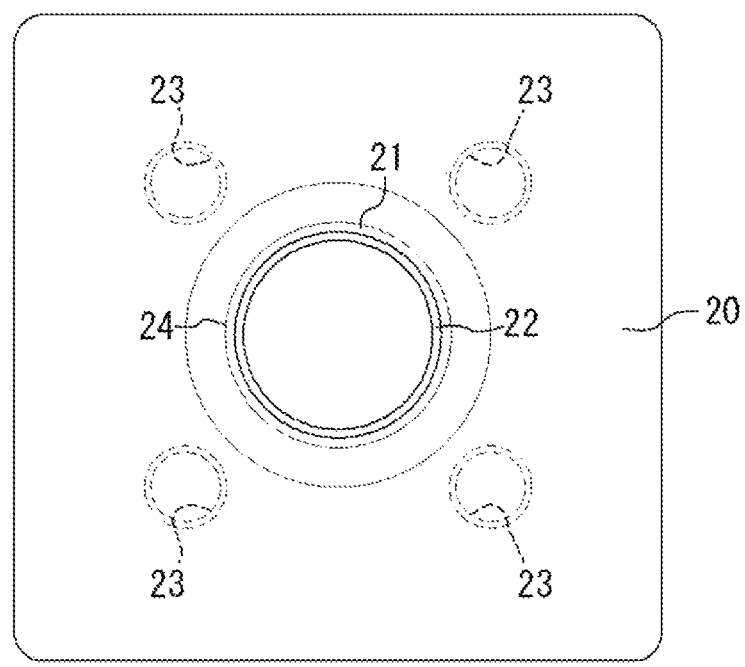
FIG. 4B is a plan view.

FIG. 4 are drawings illustrating only the first member 2 of the seismic reinforcement device 1 according to the embodiment. FIG. 4A is a front view, and FIG. 4B is a plan view. Note that a front indicates a surface of the seismic reinforcement device 1 illustrated in FIG. 1 as viewed along the bridge axis-perpendicular direction Y from the side surface of the bridge B1 (the same applies below).

As illustrated in FIG. 4, the first member 2 is made of metal, such as a steel material and cast iron, and in the first member 2, a rectangular (square) plate-shaped or a circular plate-shaped baseplate 20 and a projecting portion 21 provided to protrude facing upward in the center of the baseplate 20 are formed. The projecting portion 21 is a projection having a truncated cone shape in which an internal corner at the lower end coupled to the baseplate 20 and an external corner at the upper end are gradually curved surfaces (round surfaces).

The distal end (upper end) of the projecting portion 21 is a screw portion 22 in which a screw thread is formed and to which an additional flange 4 described below can be screwed.

As illustrated in FIG. 4B and FIG. 4A, a plurality of bolt holes 23 for joining to the bracket Bk are formed in the lower surface of the baseplate 20.

As illustrated in FIG. 4B and FIG. 4A, a shoulder portion 24 having a diameter larger than the outer diameter of the screw portion 22 and projecting out to an outside in a radial direction from a shaft core of the projecting portion 21 in a stepped manner is formed on the projecting portion 21 of the first member 2.

(Second Member)

FIG. 5 are drawings illustrating only the second member 3 of the seismic reinforcement device 1 according to the embodiment. FIG. 5A is a front view, FIG. 5B is a plan view, and FIG. 5C is a right side view. As illustrated in FIG. 5, the second member 3 is made of metal, such as a steel material and cast iron, and configured of a second member main body 30 having a rectangular (oblong) shape in a plan view, a depressed portion 31 formed in the second member main body 30, an oblong opening 32 formed at the lower end of the depressed portion 31, and the like.

As illustrated in FIG. 5A, the second member main body 30 has a tapered shape that shrinks as going to a lower portion in the front view, in which a tapered surface 30a is formed. Additionally, as illustrated in FIG. 5C, the second member main body 30 is a rectangular-shaped framing body in a side view. Then, the depressed portion 31 that is depressed in an oblong shape in a plan view and opened in an upper side is formed inside the second member main body 30. The upper portion of the second member main body 30 may be in a plate shape, and the depressed portion 31 may be closed at the upper portion. Basically, it is only necessary to be able to house the above-described projecting portion 21 in the depressed portion 31.

As illustrated in FIG. 5A to FIG. 5C, the opening 32 having an oblong shape in a plan view, which is one size smaller than the depressed portion 31, is formed in the lower portion of the depressed portion 31. The above-described projecting portion 21 of the first member 2 is housed inside the depressed portion 31 and the opening 32 in a state of being freely fitted. By being thus configured, the seismic reinforcement device 1 has a mechanism that exerts the horizontal force sharing function that resists a horizontal force by causing the projecting portion 21 to abut on the opening 32 via a buffer body 5 described below when the superstructure G1 relatively horizontally moves with respect to the substructure A1 by an earthquake motion (see FIG. 3).

Then, the second member main body 30 has an upper surface in which a plurality of bolt holes 33 for joining to the steel girder G2 as the superstructure G1 are formed.

(Additional Flange)

As illustrated in FIG. 3, the additional flange 4 is screwed to the above-described screw portion 22 of the first member 2.

Figure 6:
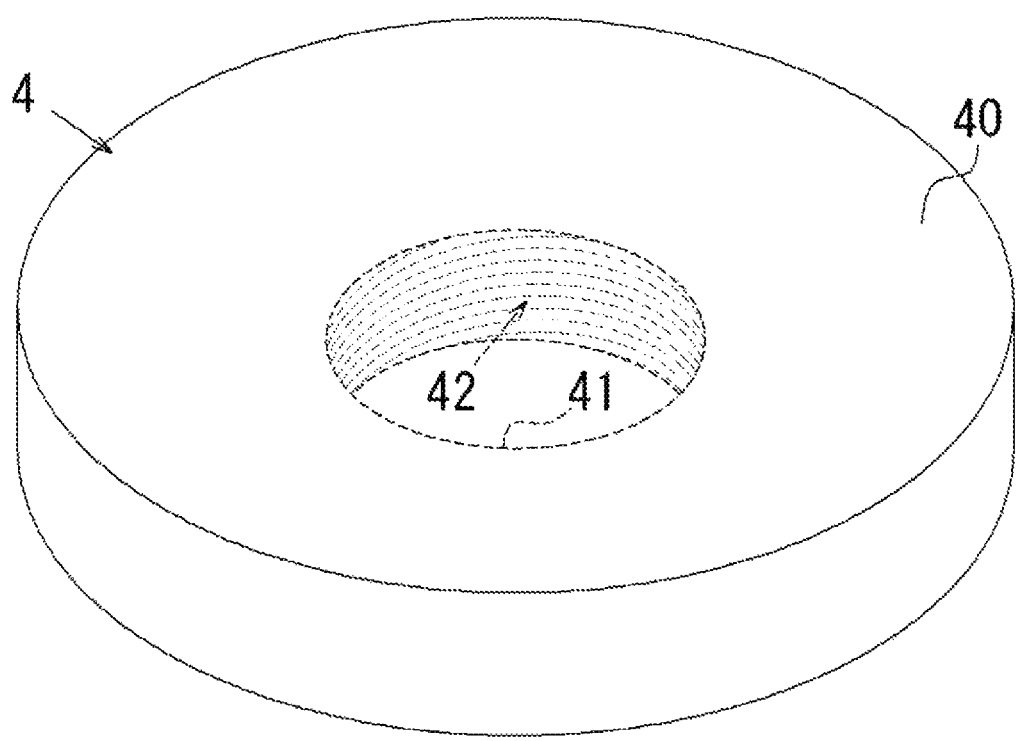
FIG. 6 is a perspective view illustrating only an additional flange of the same seismic reinforcement device as above.

FIG. 6 is a perspective view illustrating only the additional flange 4 of the seismic reinforcement device 1 according to the embodiment. As illustrated in FIG. 6, the additional flange 4 is configured of a disk-shaped flange main body 40 made of metal, such as a steel material, which covers the top of the first member 2, a circular depressed portion 41 formed in the center of the lower surface of the flange main body 40, and the like.

The circular depressed portion 41 has an inner peripheral surface on which a thread groove 42 screwed to the screw portion 22 is formed.

The additional flange 4 is mounted to the distal end of the projecting portion 21 by screwing the thread groove 42 to the screw portion 22 of the projecting portion 21. The seismic reinforcement device 1 has a mechanism that exerts the horizontal force sharing function that resists a horizontal force by causing the outer peripheral end of the additional flange 4 to abut on the depressed portion 31 when the superstructure G1 relatively horizontally moves with respect to the substructure A1 by an earthquake motion (see FIG. 3).

Figure 14:
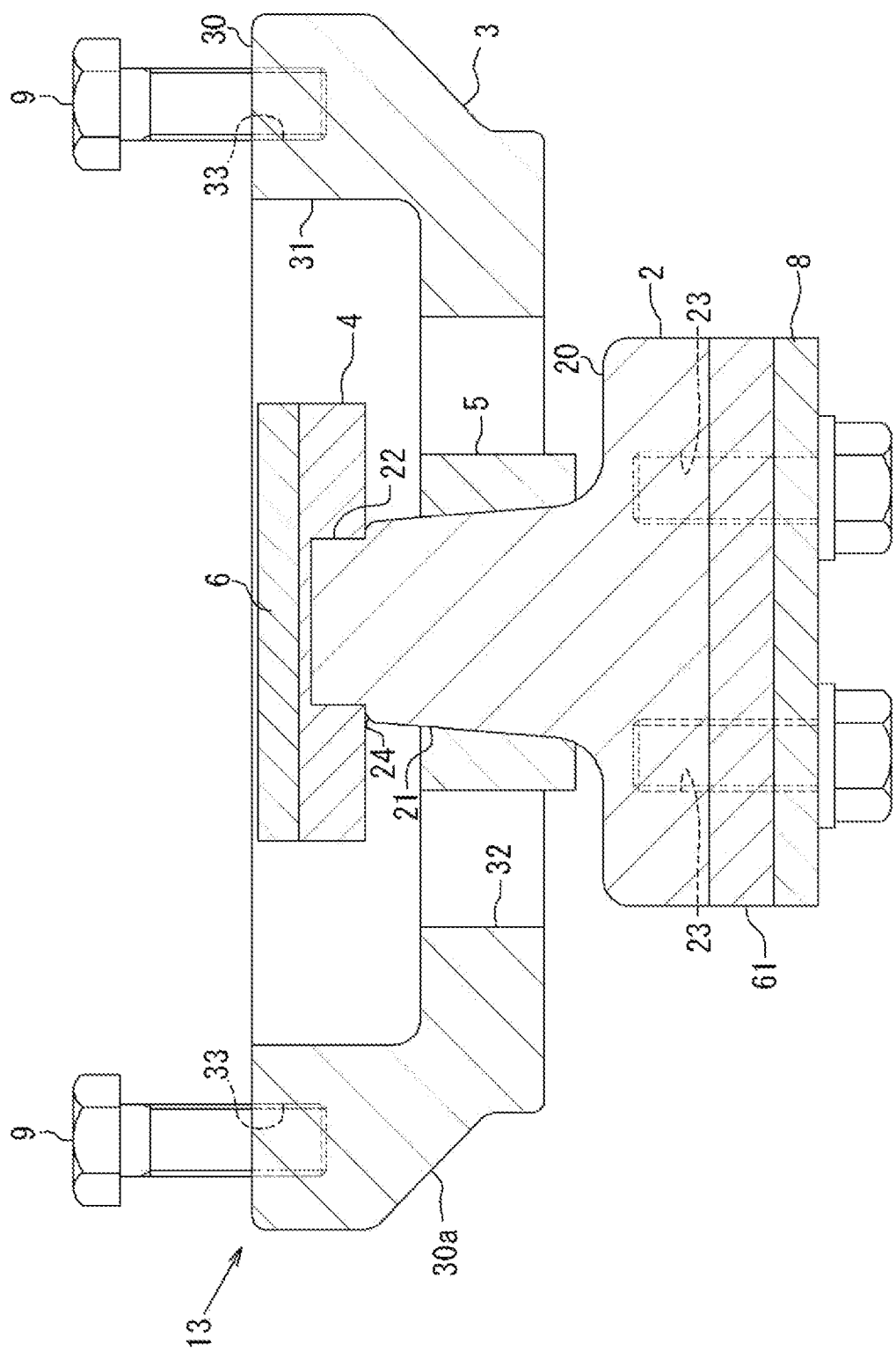
FIG. 14 is a vertical cross-sectional view illustrating a seismic reinforcement device for a bridge according to a fifth embodiment of the present invention in a state of being vertically cut off in the bridge axis direction.
Figure 17:
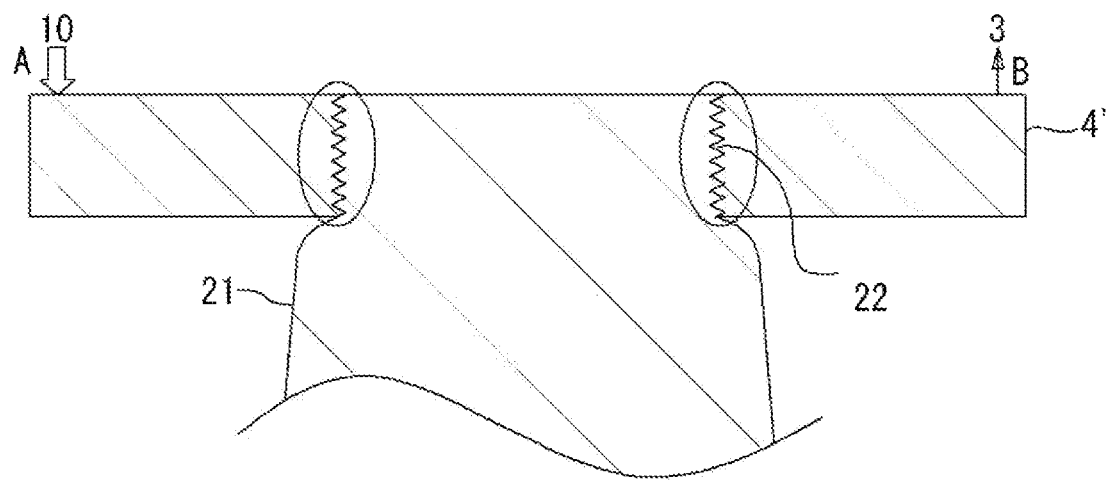
FIG. 17 is a schematic diagram illustrating a structure for coping with an uplifting force of an additional flange of a conventional stopper device.

Since only a function assumed in an additional flange 4' of a conventional stopper device is the horizontal force sharing function and the additional flange 4' is a structure for coping with an uplifting force, as illustrated in FIG. 14, a doughnut-shaped object in which a hole passing through up and down is formed is screwed to the screw portion 22. In view of this, when a dead load on one bearing line indicated by an arrow A is set to 1.0, the additional flange 4' is designed so as to withstand a force of 0.3 against an uplifting force indicated by an arrow B (see Section 13.1 Bearing Part of Specifications for Highway Bridges and its commentary, Part V Seismic Design, issued in November 2017). FIG. 17 is a schematic diagram illustrating the structure for coping with an uplifting force of the additional flange of the conventional stopper device.

Accordingly, it is considered that, if a load is applied so as to make a seismic reinforcement device playing a role in a horizontal force sharing function work simply as a level difference preventive function, the seismic reinforcement device cannot withstand the load due to damage, such as breakage on parts indicated by elongate circles of the additional flange 4'. In view of this, the additional flange 4 according to the embodiment is configured to be the above-described additional flange 4 that is a threaded disk having a lid structure (cap shape) covering the top of the first member 2 so as to play a role in a level difference preventive function in cooperation with a spacer 6 described below.

As described above, the shoulder portion 24 projecting out to the outside in the radial direction from the shaft core of the projecting portion 21 in a stepped manner is formed on the projecting portion 21. In view of this, in a state where the additional flange 4 is completely screwed to the screw portion 22 and the bottom surface (horizontal surface) of the circular depressed portion 41 abuts on the upper surface of the projecting portion 21, the shoulder portion 24 abuts on the lower surface of the additional flange 4. Accordingly, when the superstructure G1 drops and the level difference preventive function is exerted, the screw portion 22 in the additional flange 4 being damaged by an impact force of the dropping can be avoided by hooking the additional flange 4 on the shoulder portion 24.

Considering the impact force of the dropping of the superstructure G1, a projecting-out length d1 of the shoulder portion 24 from the outer peripheral end of the screw portion 22 to the outside illustrated in FIG. 4A is preferably 1 mm or more (realistically 30 mm or less taking the space into consideration), and more preferably 7 mm or more.

(Buffer Body)

As illustrated in FIG. 3, the tubular buffer body 5 is fitted to the outer peripheral surface of the projecting portion 21. The buffer body 5 is a rubber member made of a rubber elastic body (rubber material) which exhibits rubber elasticity at an ordinary temperature, such as ethylene propylene diene monomer (EPDM), chloroprene (CR) rubber, and styrene-butadiene rubber (SBR).

Figure 7:
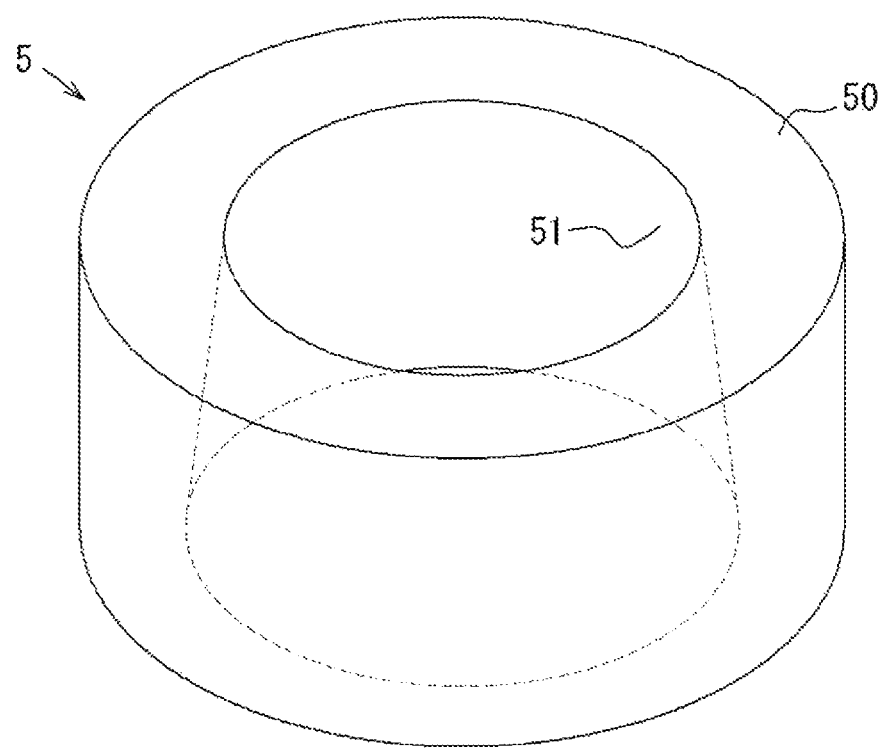
FIG. 7 is a perspective view illustrating only a buffer body of the same seismic reinforcement device as above.

FIG. 7 is a perspective view illustrating only the buffer body 5 of the seismic reinforcement device 1 according to the embodiment. As illustrated in FIG. 7, the buffer body 5 is mainly configured of a cylindrical buffer body main body 50, and a tapered opening S1 that is radially expanded as going downward according to the truncated cone shape of the projecting portion 21 is formed on the inner peripheral surface of the buffer body main body 50.

The buffer body 5 has a function that reduces an impact when the first member 2 abuts on the second member 3 by causing the outer peripheral surface of the buffer body main body 50 to abut on the opening 32 before the outer peripheral end of the additional flange 4 abuts on the depressed portion 31 when the superstructure G1 relatively horizontally moves with respect to the substructure A1 by an earthquake motion. This is to keep the seismic reinforcement device 1 from being damaged by a predetermined earthquake motion of about level 1. The buffer body 5 can be omitted.

(Spacer)

As illustrated in FIG. 3, the disk-shaped spacer 6 is adhered and joined to the upper end of the projecting portion 21 of the first member 2. The spacer 6 suppresses dropping of the superstructure G1 and exerts the level difference preventive function that reduces a level difference on the upper surface of the superstructure G1 by its thickness when upper bolts 9 are broken by the level 2 earthquake motion and the above-described horizontal force sharing function of the seismic reinforcement device 1 is damaged.

The spacer 6 is a disk-shaped member that is approximately identical in diameter to the additional flange 4 and has a predetermined thickness, and in the embodiment, similarly to the buffer body 5, the spacer 6 is a buffer material made of a rubber elastic body (rubber material) which exhibits rubber elasticity at an ordinary temperature, such as ethylene propylene diene monomer (EPDM), chloroprene (CR) rubber, and styrene-butadiene rubber (SBR).

However, the spacer 6 may be made of metal, such as a steel material, and can be configured of an inorganic material made of concrete, mortar, or the like, or can be configured of resin or the like. Basically, it is only necessary for the spacer according to the present invention to be configured of a material having a predetermined compressive strength that can withstand the impact of dropping of the superstructure G1.

However, it is preferred that the spacer 6 is configured of a rubber elastic body (rubber material) because against the impact of dropping of the superstructure G1 at the time of an earthquake and even in a case where emergency vehicles pass on the superstructure G1 after that, a buffering effect is provided, the steel girder G2 and the substructure A1 are less likely to be damaged, and the restorability of the bridge B1 is improved.

Figure 8A:
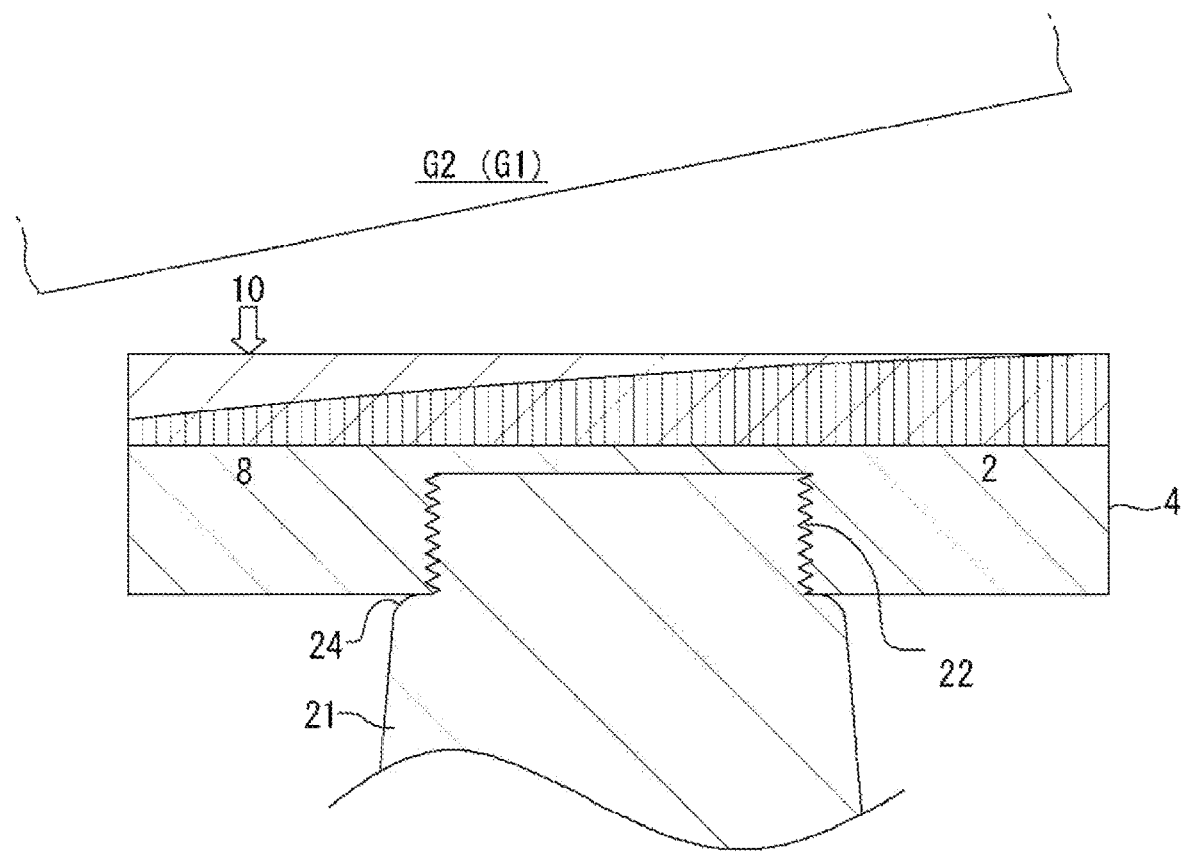
FIG. 8A is a schematic diagram illustrating a state where an unbalanced load acts on a spacer 6 and an additional flange 4 according to the embodiment.

FIG. 8A is a schematic diagram illustrating a state where an unbalanced load acts on the spacer 6 and the additional flange 4 according to the embodiment. As illustrated in FIG. 8A, in a case where a load acts on the proximity of the outer edge of the additional flange 4, configuring the spacer 6 from a rubber elastic body (rubber material) allows the load to be shared with the entire rubber by the proportion of, for example 8:2, to keep the stress from concentrating. In view of this, a shear force of the plate thickness of the additional flange 4 having a lid structure and a dispersing function of the spacer 6 made of a rubber material allow for supporting a dead load of the upper structure, and the level difference preventive function can be exerted.

Figure 8B:
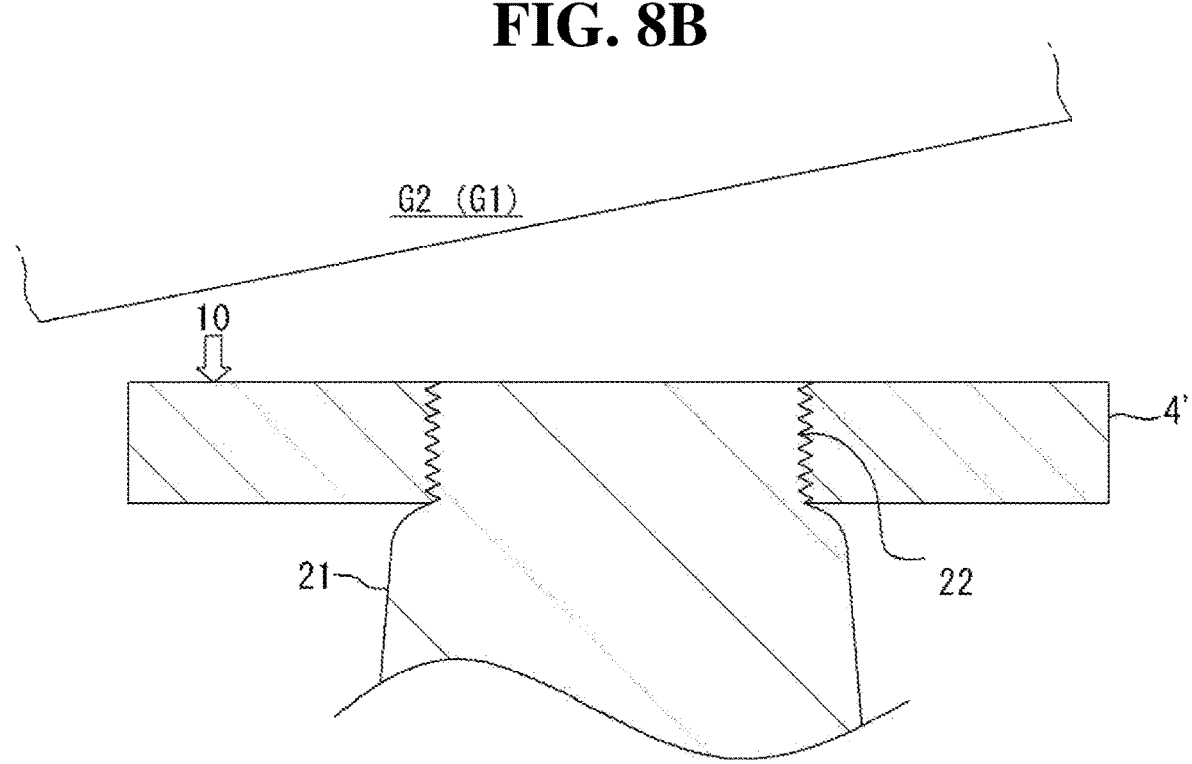
FIG. 8B is a schematic diagram illustrating a state where an unbalanced load acts on a conventional stopper device.

In contrast to this, as illustrated in FIG. 8B, only with an additional flange made of a conventional perforated disk without a rubber material, a load 10 that acts on the proximity of the outer edge of the additional flange 4' is directly applied, and as described above, the proximity of the screw portion 22 is highly likely to be damaged and broken. FIG. 8B is a schematic diagram illustrating a state where an unbalanced load acts on a conventional stopper device.

The thickness of the spacer 6 is appropriately determined by the distance between the superstructure G1 and the projecting portion 21, the distance between the second member 3 and the projecting portion 21, or the distance from an interposed object between the superstructure G1 and the second member 3 to the projecting portion 21. Basically, the thickness of the spacer 6 is determined from the aspect that the spacer 6 adhered to the distal end of the projecting portion 21, the superstructure G1, and the like are not in contact with respect to rotation of the superstructure G1 at a normal time and the above-described level difference preventive function that suppresses the height from which the superstructure G1 drops and reduces the level difference can be exerted without hindering the above-described horizontal force sharing function.

However, for the thickness of the spacer 6, it is preferred that the spacer 6 is made of a rubber elastic body (rubber material) having a thickness of at least 5 mm or more and 200 mm or less. This is because securing a predetermined thickness or more of the spacer 6 ensures having a function that does not only support a dead load in an emergency but also substitutes for a part of a bearing function for withstanding a live load and the like by passing vehicles to a certain extent.

That is, the spacer 6 has a function that can counteract a load including the dead load, a horizontal load caused by a temperature change, and a rotation load caused by an up and down motion (vibration) and the like of a girder with the thickness of the rubber elastic body (rubber material) as long as it is for a short period of time and safely support the dropped upper structure by substituting for a part of the bearing function. Substituting for a part of the bearing function means that, in an emergency, such as when the superstructure G1 drops, the bearing function to the extent that allows emergency vehicles and general vehicles to pass for a certain period of time until being restored is exerted.
(Metal Plate)

As illustrated in FIG. 1 and FIG. 2, in the seismic reinforcement device 1, the first member 2 and the second member 3 are joined by bolts via metal plates 7 of a steel material or the like. Then, in the metal plate 7, an elongate hole being long in the up-down direction and an elongate hole being long in the horizontal direction are formed, and when the seismic reinforcement device is mounted, the first member 2 and the second member 3 are joined via the elongate holes. In view of this, similarly to the spacer 6, the metal plate 7 can exert the level difference preventive function without hindering the above-described horizontal force sharing function by being removed after the seismic reinforcement device is mounted. The metal plate 7 can be omitted.

Modification of First Embodiment

Figure 9:
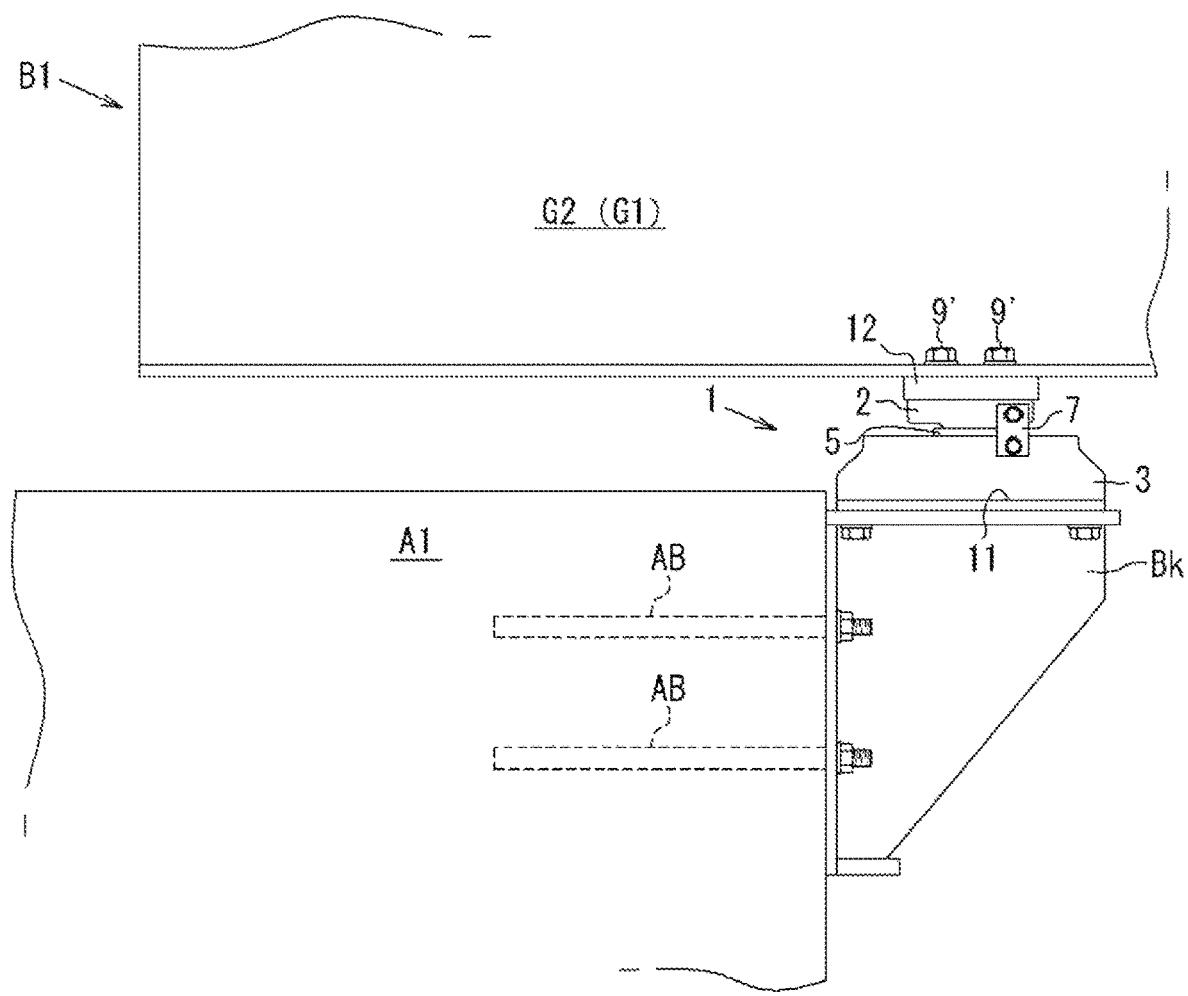
FIG. 9 is a partially enlarged side view illustrating a modification of a seismic reinforcement device for a bridge 1 according to the first embodiment of the present invention and a bridge as viewed in the bridge axis-perpendicular direction.

Next, using FIG. 9, a modification of the seismic reinforcement device for a bridge 1 according to the first embodiment will be described. FIG. 9 is a partially enlarged side view illustrating the modification of the seismic reinforcement device for a bridge 1 according to the first embodiment of the present invention and a bridge as viewed in the bridge axis-perpendicular direction (equivalent to FIG. 1). As illustrated in FIG. 9, although the seismic reinforcement device 1 according to the modification of the first embodiment has a configuration identical to the above-described seismic reinforcement device 1, the top and bottom of the seismic reinforcement device 1 according to the modification is mounted invertedly with the above-described seismic reinforcement device 1.

Basically, as illustrated in FIG. 9, the first member 2 is joined by bolts to the steel girder G2 as the superstructure G1, and the second member 3 is joined by bolts to the bracket Bk provided to protrude on the side surface of the substructure A1. However, since other configurations are identical to those of the above-described seismic reinforcement device 1, detailed description thereof will be omitted. However, since the seismic reinforcement device 1 needs to remain on the bracket Bk even after an earthquake, different from a fourth embodiment described below, a weak point needs to be upper bolts 9' on the upper side (see also the paragraph [0065]).

[Operational Advantage of Seismic Reinforcement Device for Bridge]

With the seismic reinforcement device for a bridge 1 according to the embodiment of the present invention described above, since the horizontal force sharing function and the level difference preventive function can be used in combination, the seismic reinforcement device 1 can be installed with a small space, and a narrow space around a bearing can be effectively utilized to reduce an installation cost.

With the seismic reinforcement device 1, since the bracket Bk and the like do not necessarily have to project out from the substructure A1, a dual-purpose device that has a combination of the horizontal force sharing function and the level difference preventive function can be provided even when there is no room for the bracket Bk and the like to project out from the substructure A1.

In addition, with the seismic reinforcement device 1, maintenance and management of the device becomes easy even in the narrow space around the bearing, and a trouble can be promptly discovered and dealt with.

Furthermore, with the seismic reinforcement device 1, since the spacer 6 is a buffer material made of a rubber elastic body, the steel girder G2 as a main girder and the substructure A1 are less likely to be damaged even in a case where emergency vehicles pass on the seismic reinforcement device 1 in which the horizontal force sharing function is damaged and a small level difference is generated. In view of this, the restorability of the bridge B1 is improved. With the seismic reinforcement device 1, configuring the spacer 6 from a rubber elastic body (rubber material) allows the load to be shared with the entire rubber to keep the stress from concentrating. In view of this, a shear force of the plate thickness of the additional flange 4 having a lid structure and a dispersing function of the spacer 6 made of a rubber material allow for supporting a dead load of the upper structure, and the level difference preventive function can be exerted.

In addition to that, with the seismic reinforcement device 1, since the spacer 6 is joined to the distal end of the projecting portion 21, the spacer 6 does not interfere when the first member 2 and the second member 3 operate and relatively horizontally move, and the level difference preventive function does not possibly hinder the horizontal force sharing function.

Second Embodiment

Figure 10:
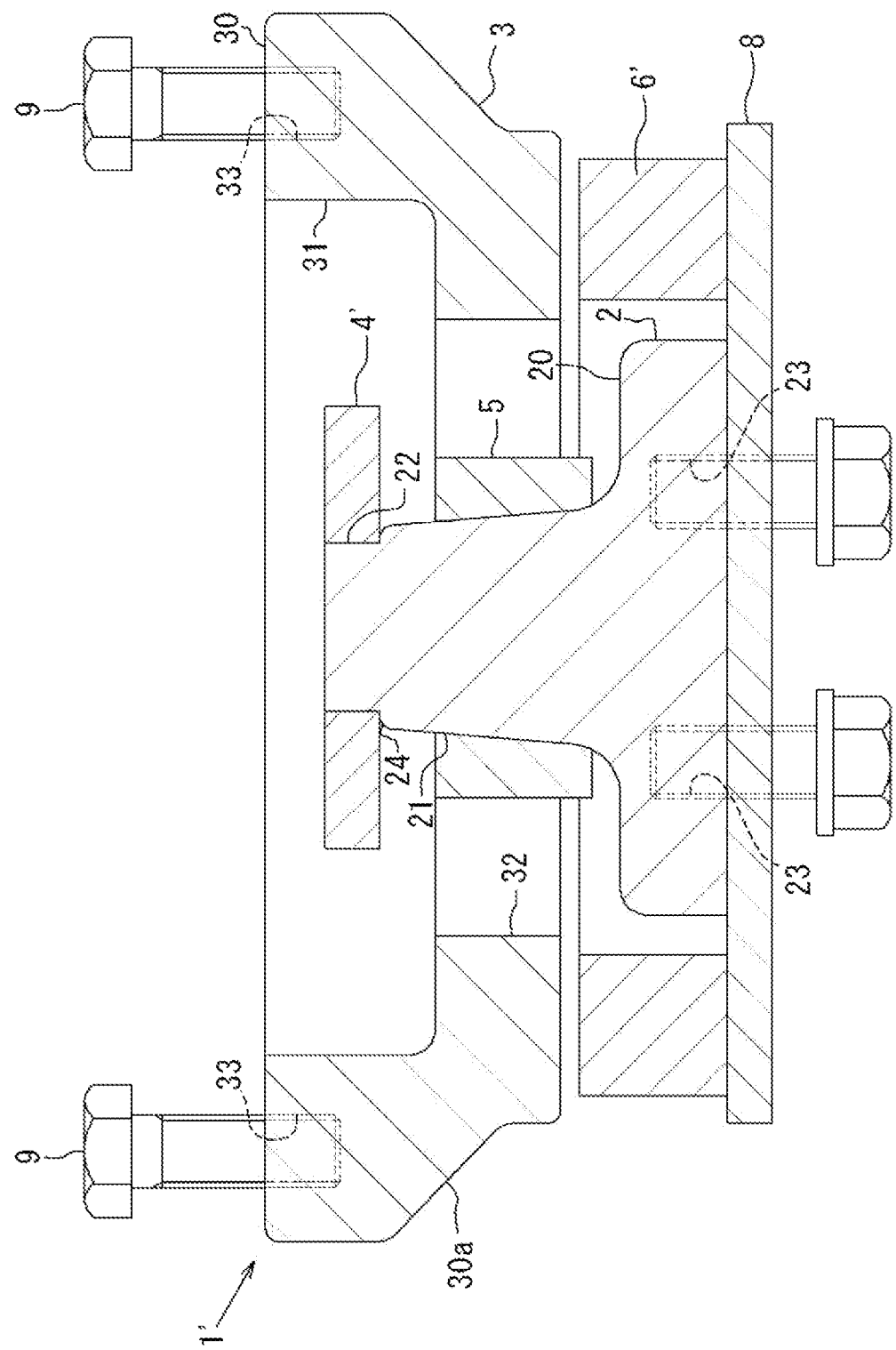
FIG. 10 is a vertical cross-sectional view illustrating a seismic reinforcement device for a bridge according to a second embodiment of the present invention in a state of being vertically cut off in the bridge axis direction.
Figure 11:
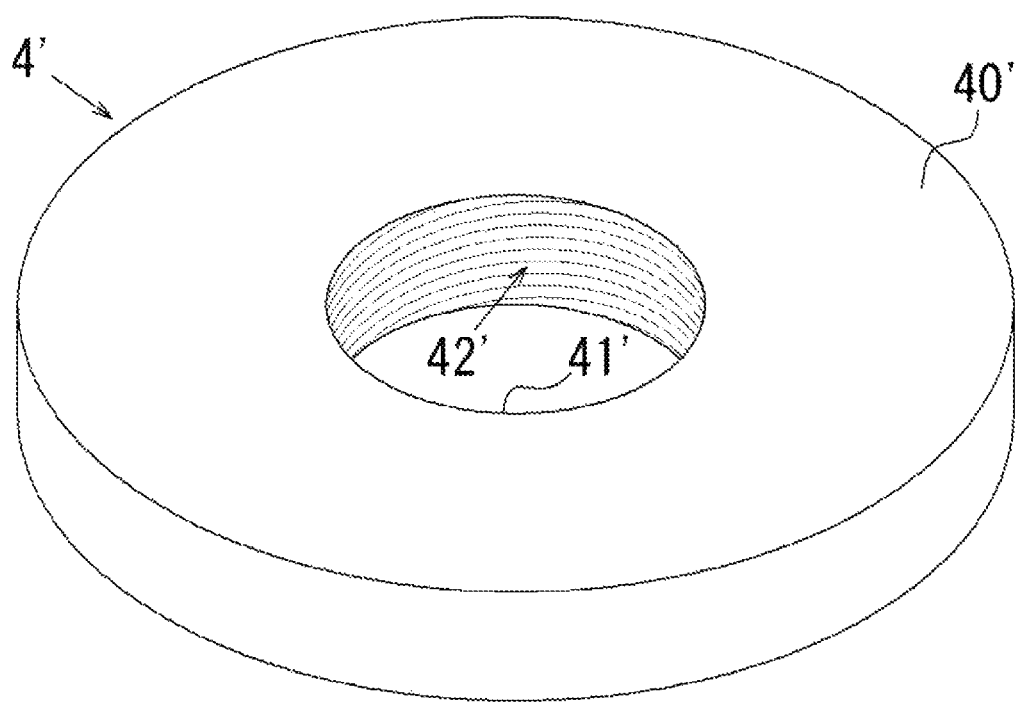
FIG. 11 is a perspective view illustrating only an additional flange of the same seismic reinforcement device as above.

Next, using FIG. 10 and FIG. 11, a seismic reinforcement device for a bridge 1' (hereinafter also simply referred to as the seismic reinforcement device 1') according to a second embodiment of the present invention will be described. FIG. 10 is a vertical cross-sectional view illustrating the seismic reinforcement device for a bridge 1' according to the second embodiment of the present invention in a state of being vertically cut off in the bridge axis direction (equivalent to FIG. 3). FIG. 11 is a perspective view illustrating only the additional flange 4' of the seismic reinforcement device 1'. Since a point in which the seismic reinforcement device 1' differs from the above-described seismic reinforcement device 1 is mainly an installation position of a spacer 6', the point will be described. Other identical configurations are denoted by identical reference numerals, and the description thereof will be omitted.

The spacer 6' of the seismic reinforcement device 1' is a buffer material made of a rubber elastic body (rubber material). As illustrated in FIG. 10, the spacer 6' is placed on a rectangular-shaped (square-shaped) plate 8 made of a steel plate or the like that is one size larger than the baseplate 20 that is joined to the above-described first member 2 to be integrated with the first member 2. Surely, similarly to the spacer 6, the spacer 6' may also be made of metal, such as a steel material, and can be configured of an inorganic material made of concrete, mortar, or the like, or can be configured of resin or the like.

The spacer 6' is a doughnut-shaped or rectangular-shaped member having an inner diameter that is one size larger than the baseplate 20 of the first member 2. The inner diameter does not hinder relative horizontal movement of the first member 2 and the second member 3 that operate as the horizontal force sharing function.

Since the additional flange 4' does not directly play a role in the level difference preventive function and does not receive a load, as illustrated in FIG. 11, similarly to a conventional additional flange, the additional flange 4' is configured of a perforated disk-shaped flange main body 40' made of metal, such as a steel material, a circular opening 41' formed in the center of the lower surface of the flange main body 40', and the like. The circular opening 41' has an inner peripheral surface on which a thread groove 42' screwed to the above-described screw portion 22 is formed.

With the seismic reinforcement device for a bridge 1' according to the second embodiment of the present invention, similarly to the seismic reinforcement device 1, since the horizontal force sharing function and the level difference preventive function can be used in combination, the seismic reinforcement device 1' can be installed with a small space, and a narrow space around a bearing can be effectively utilized to reduce an installation cost.

Third Embodiment

Figure 12:
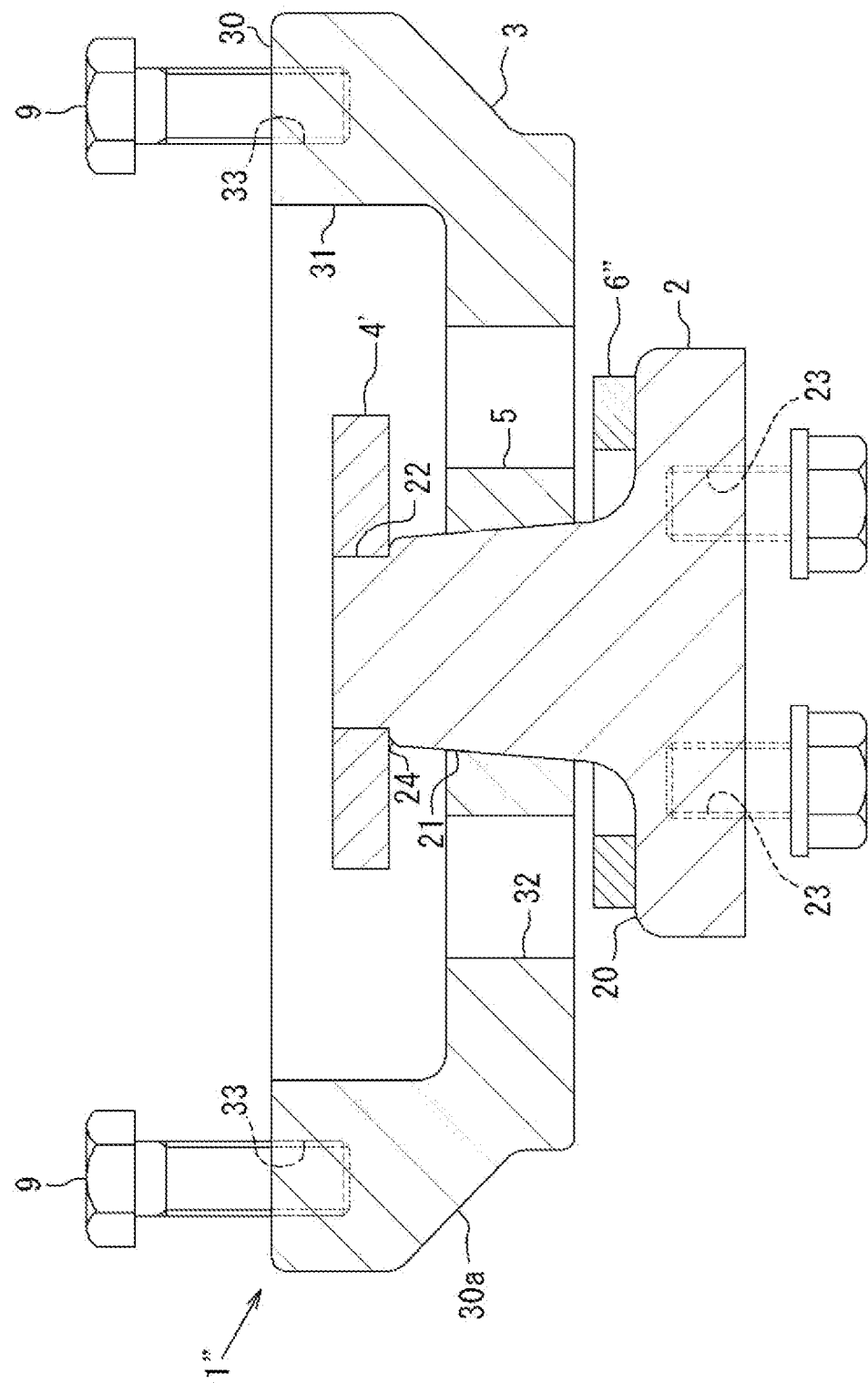
FIG. 12 is a vertical cross-sectional view illustrating a seismic reinforcement device for a bridge according to a third embodiment of the present invention in a state of being vertically cut off in the bridge axis direction.

Next, using FIG. 12, a seismic reinforcement device for a bridge 1" (hereinafter also simply referred to as a seismic reinforcement device 1") according to a third embodiment of the present invention will be described. FIG. 12 is a vertical cross-sectional view illustrating the seismic reinforcement device for a bridge 1" according to the third embodiment of the present invention in a state of being vertically cut off in the bridge axis direction (equivalent to FIG. 3). Since only a point in which the seismic reinforcement device 1" differs from the above-described seismic reinforcement device 1' is an installation position of a spacer 6", the point will be described. Other identical configurations are denoted by identical reference numerals, and the description thereof will be omitted.

The spacer 6" of the seismic reinforcement device 1" is a buffer material made of a rubber elastic body (rubber material), and as illustrated in FIG. 11, is placed on the baseplate 20 of the above-described first member 2. Surely, the spacer 6" may be made of metal, such as a steel material, and can be configured of an inorganic material made of concrete, mortar, or the like, or can be configured of resin or the like.

The spacer 6" is a doughnut-shaped or rectangular-shaped member having an inner diameter that is one size larger than the baseplate 20 of the first member 2. The inner diameter does not hinder relative horizontal movement of the first member 2 and the second member 3 that operate as the horizontal force sharing function.

With the seismic reinforcement device for a bridge 1" according to the third embodiment of the present invention, similarly to the seismic reinforcement device 1, since the horizontal force sharing function and the level difference preventive function can be used in combination, the seismic reinforcement device 1" can be installed with a small space, and a narrow space around a bearing can be effectively utilized to reduce an installation cost.

Fourth Embodiment

Figure 13:
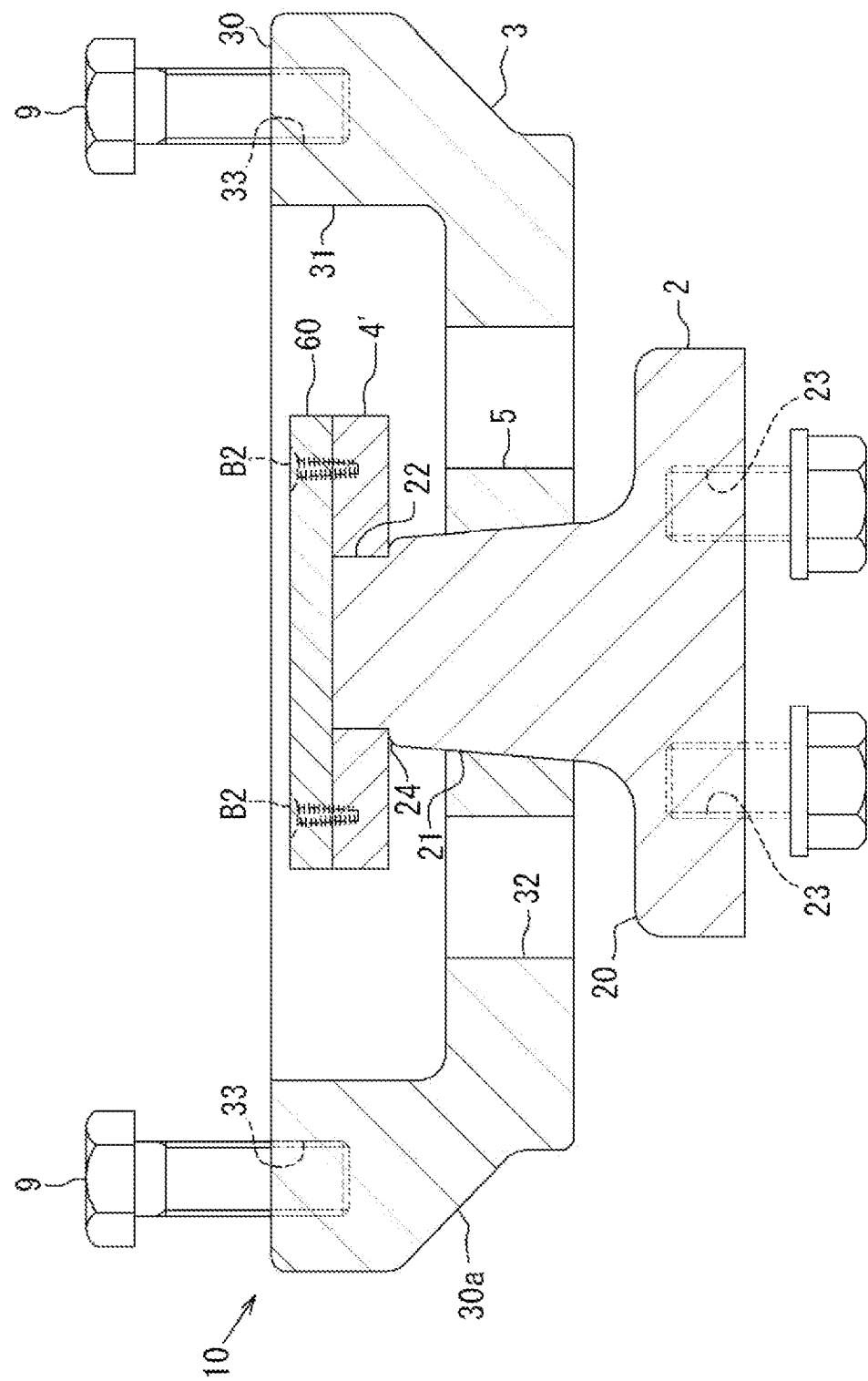
FIG. 13 is a vertical cross-sectional view illustrating a seismic reinforcement device for a bridge according to a fourth embodiment of the present invention in a state of being vertically cut off in the bridge axis direction.

Next, using FIG. 13, a seismic reinforcement device for a bridge 10 (hereinafter also simply referred to as a seismic reinforcement device 10) according to a fourth embodiment of the present invention will be described. FIG. 13 is a vertical cross-sectional view illustrating the seismic reinforcement device for a bridge 10 according to the fourth embodiment of the present invention in a state of being vertically cut off in the bridge axis direction. A point in which the seismic reinforcement device 10 differs from the above-described seismic reinforcement device 1 is mainly a point in which the additional flange 4' is a conventional perforated disk-shaped flange. Accordingly, other identical configurations are denoted by identical reference numerals, and the description thereof will be omitted.

It is considered that, if a load is applied so as to cause a seismic reinforcement device playing a role in the horizontal force sharing function to work simply as the level difference preventive function, the seismic reinforcement device cannot withstand the load due to damage, such as breakage on parts indicated by elongate circles of the additional flange. In view of this, a spacer 60 according to the embodiment is made larger and thicker than the above-described spacer 6 and is mechanically secured to the additional flange 4' by screwing screws B2 and the like to compensate for the lack of adhesive strength with the additional flange 4'. However, joining of the spacer 60 to the additional flange 4' is not limited to securing by screwing, and both may be joined so as to be mechanically fastened by providing a lock piece with which any one of the additional flange 4' and the spacer 60 is hooked to the other or both.

Similarly to the spacer 6, the spacer 60 according to the embodiment is a buffer material made of a rubber elastic body (rubber material). Surely, similarly to the spacer 6, the spacer 60 may also be made of metal, such as a steel material, and can be configured of an inorganic material made of concrete, mortar, or the like, or can be configured of resin or the like.

It is also considered that the spacer 60 according to the embodiment is not mechanically secured to the additional flange 4' by screwing, but adhesion (for example, adhesion with an elastic adhesive with a satisfactory adhesiveness with a rubber elastic body which flexibly absorbs and disperses stress applied from an inside and outside to a joint portion) is performed using an adhesive that allows a strong adhesion to the additional flange 4' to increase the adhesive strength and vulcanization bonding is performed by applying heat and pressure to the additional flange 4'.

With the seismic reinforcement device for a bridge 10 according to the fourth embodiment of the present invention, similarly to the seismic reinforcement device 1, since the horizontal force sharing function and the level difference preventive function can be used in combination, the seismic reinforcement device 10 can be installed with a small space, and a narrow space around a bearing can be effectively utilized to reduce an installation cost.

Fifth Embodiment

Next, using FIG. 14, a seismic reinforcement device for a bridge 13 (hereinafter also simply referred to as a seismic reinforcement device 13) according to a fifth embodiment of the present invention will be described. FIG. 14 is a vertical cross-sectional view illustrating the seismic reinforcement device for a bridge 13 according to the fifth embodiment of the present invention in a state of being vertically cut off in the bridge axis direction. A point in which the seismic reinforcement device 13 differs from the above-described seismic reinforcement device 1 is mainly a point in which, in addition to the spacer 6, a second spacer 61 is interposed between the first member 2 and the plate 8. Accordingly, other identical configurations are denoted by identical reference numerals, and the description thereof will be omitted.

The second spacer 61 of the seismic reinforcement device 13 is a buffer material made of a rubber elastic body (rubber material) having a thickness of at least 5 mm or more and 200 mm or less, and as illustrated in FIG. 14, is interposed between the baseplate 20 of the first member 2 and the plate 8. The second spacer 61 is a rectangular-shaped member having an area similar to that of the baseplate 20 of the first member 2 in a plan view and has a function that does not only support a dead load in an emergency but also substitutes for a part of a bearing function for withstanding a live load and the like by passing vehicles to a certain extent.

That is, the second spacer 61 has a function that can counteract a load including the dead load, a horizontal load caused by a temperature change, and a rotation load caused by an up and down motion (vibration) and the like of a girder with the thickness of the rubber elastic body (rubber material) as long as it is for a short period of time and safely support the dropped upper structure by substituting for a part of the bearing function. Substituting for a part of the bearing function means that, in an emergency, such as when the superstructure G1 drops, the bearing function to the extent that allows emergency vehicles and general vehicles to pass for a certain period of time until being restored is exerted.

With the seismic reinforcement device for a bridge 13 according to the fifth embodiment of the present invention, similarly to the seismic reinforcement device 1, since the horizontal force sharing function and the level difference preventive function can be used in combination, the seismic reinforcement device 13 can be installed with a small space, and a narrow space around a bearing can be effectively utilized to reduce an installation cost.

In addition, with the seismic reinforcement device 13, the second spacer 61 made of a rubber elastic body substitutes for a part of the bearing function in an emergency, such as when the superstructure G1 drops by an earthquake, and the dropped upper structure can be safely supported.

Sixth Embodiment

Figure 15:
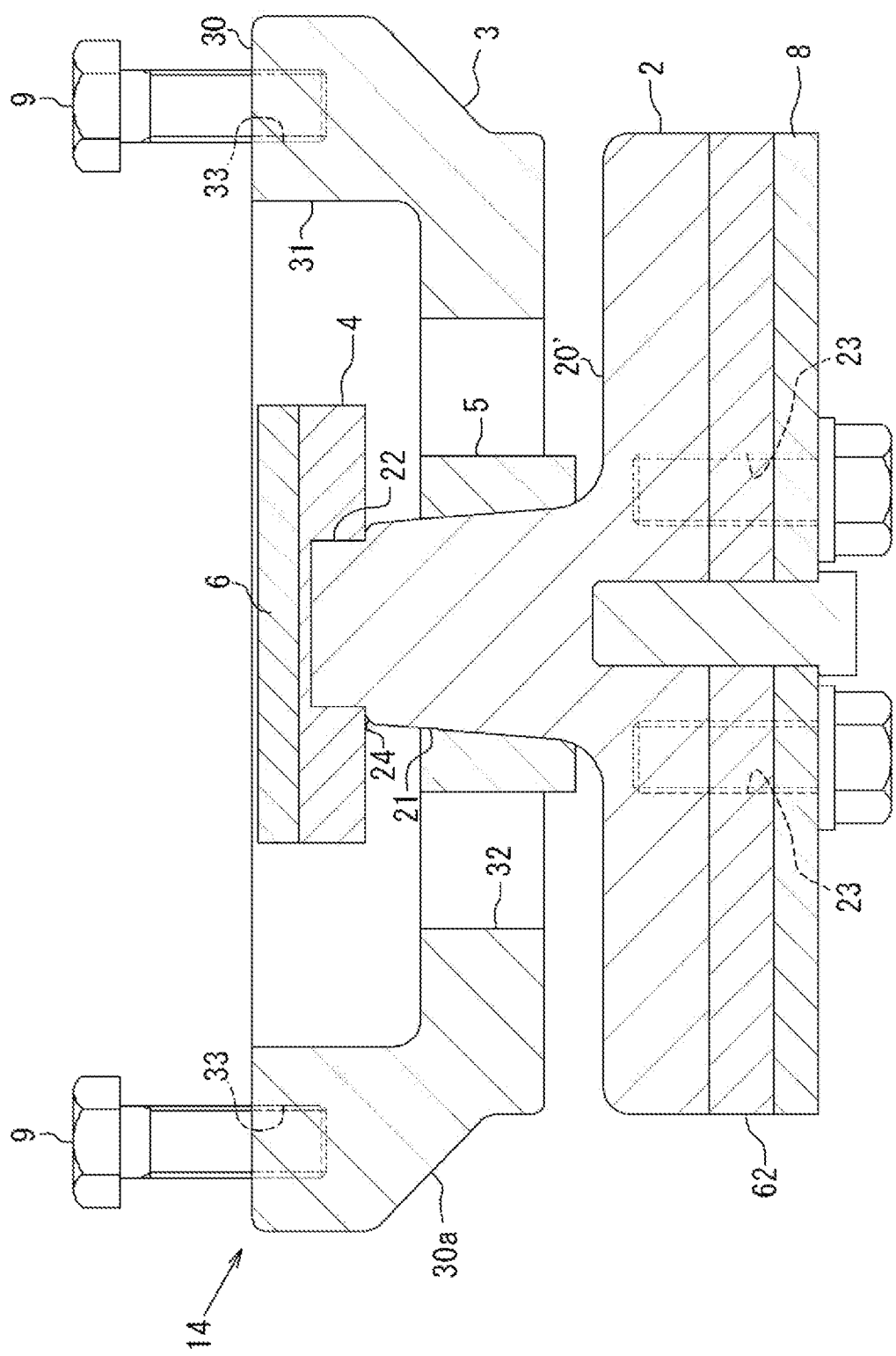
FIG. 15 is a vertical cross-sectional view illustrating a seismic reinforcement device for a bridge according to a sixth embodiment of the present invention in a state of being vertically cut off in the bridge axis direction.

Next, using FIG. 15, a seismic reinforcement device for a bridge 14 (hereinafter also simply referred to as a seismic reinforcement device 14) according to a sixth embodiment of the present invention will be described. FIG. 15 is a vertical cross-sectional view illustrating the seismic reinforcement device for a bridge 14 according to the sixth embodiment of the present invention in a state of being vertically cut off in the bridge axis direction. Points in which the seismic reinforcement device 14 differs from the above-described seismic reinforcement device 13 are mainly a point in which a baseplate 20' of the first member 2 and a second spacer 62 have an area larger than that of the above-described baseplate 20 and the second spacer 61 and a point in which a rod 15 is provided. Accordingly, other identical configurations are denoted by identical reference numerals, and the description thereof will be omitted.

The second spacer 62 of the seismic reinforcement device 14 is a buffer material made of a rubber elastic body (rubber material) having a thickness of about 5 mm, and as illustrated in FIG. 15, is interposed between the baseplate 20' of the first member 2 and the plate 8. Similarly to the second spacer 61, the second spacer 62 is a rectangular-shaped member having an area similar to that of the baseplate 20' of the first member 2 in a plan view and has a function that does not only support a dead load in an emergency but also substitutes for a part of a bearing function for withstanding a live load and the like by passing vehicles to a certain extent.

The baseplate 20' of the first member 2 and the second spacer 62 of the seismic reinforcement device 14 has an area of 1.3 times or more the area of the above-described baseplate 20 and the spacer 61 in a plan view, and increasing the area of the second spacer 62 reduces a load that can be supported per unit area and improves a load bearing capacity. This improves a substitutability of the bearing function by the second spacer 62 and improves the load bearing capacity.

As illustrated in FIG. 15, the rod 15 is provided in the seismic reinforcement device 14. The rod 15 is fixedly secured by screwing, welding, or the like to and provided upright on the plate 8 or the bracket Bk and has a function that restrains the baseplate 20' from shifting in the horizontal direction. This is to keep the second spacer 62 made of a rubber elastic body from deforming by a temperature change of the bridge main body and becoming unable to support a vertical load. The rod 15 can be substituted by thickening bolts to fasten the first member 2.

With the seismic reinforcement device for a bridge 14 according to the sixth embodiment of the present invention, similarly to the seismic reinforcement device 1, since the horizontal force sharing function and the level difference preventive function can be used in combination, the seismic reinforcement device 14 can be installed with a small space, and a narrow space around a bearing can be effectively utilized to reduce an installation cost.

Further, with the seismic reinforcement device 14, the second spacer 62 made of a rubber elastic body substitutes for a part of the bearing function in an emergency, such as when the superstructure G1 drops by an earthquake, and the dropped upper structure can be safely supported.

In addition, with the seismic reinforcement device 14, since the superstructure G1 is supported by the second spacer 62 made of a rubber elastic body having an area of 1.3 times or more the area of the second spacer 61, the load that can be supported per unit area can be reduced, and the load bearing capacity is improved. In addition to that, the seismic reinforcement device 14 restrains the baseplate 20' from shifting in the horizontal direction by the rod 15, and the horizontal force sharing function of the seismic reinforcement device 14 is not impaired by the second spacer 62.

Seventh Embodiment

Figure 16:
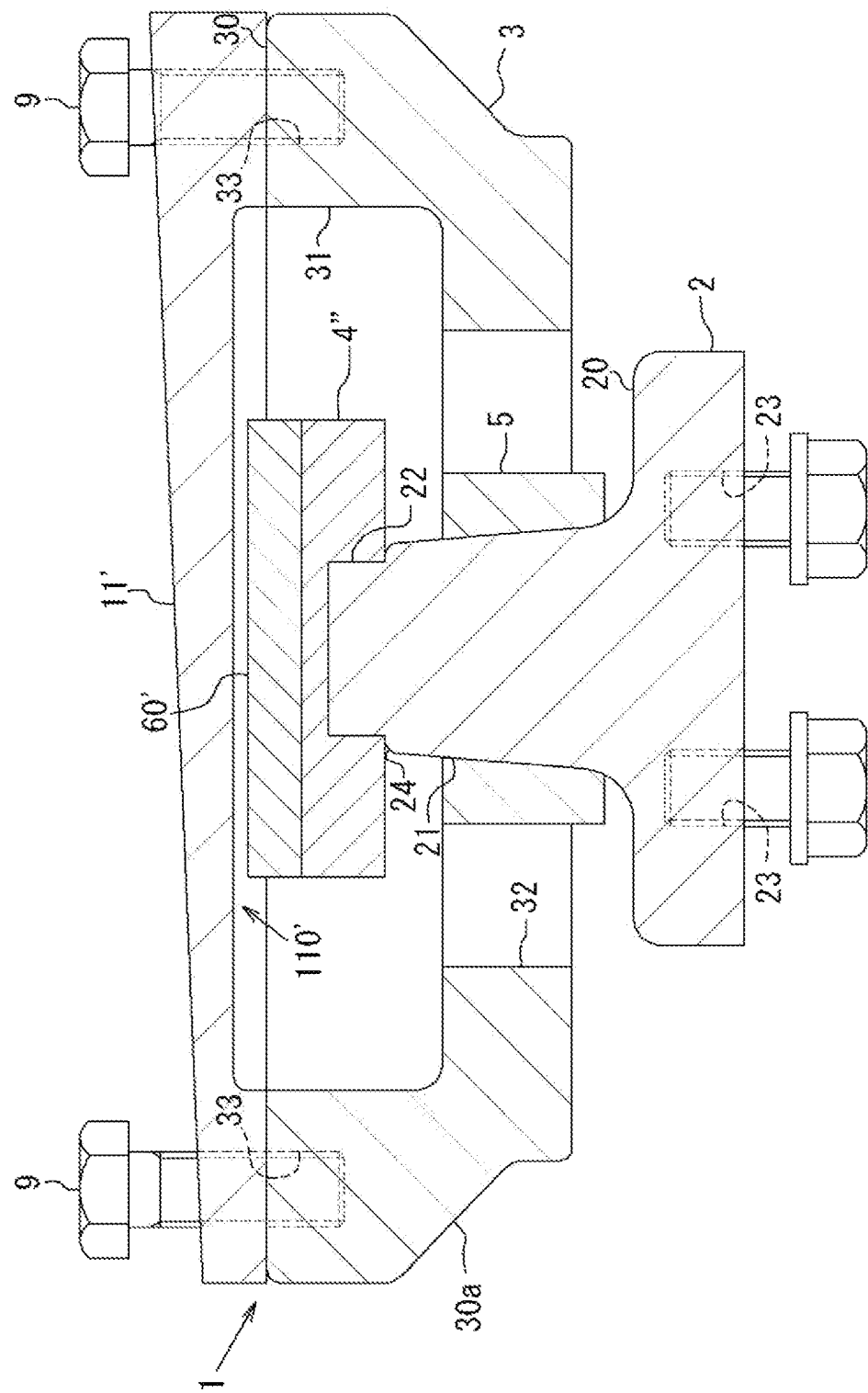
FIG. 16 is a vertical cross-sectional view illustrating a seismic reinforcement device for a bridge according to a seventh embodiment of the present invention in a state of being vertically cut off in the bridge axis direction.

Next, using FIG. 16, a seismic reinforcement device for a bridge 16 (hereinafter also simply referred to as a seismic reinforcement device 16) according to a seventh embodiment of the present invention will be described. FIG. 16 is a vertical cross-sectional view illustrating the seismic reinforcement device for a bridge 16 according to the seventh embodiment of the present invention in a state of being vertically cut off in the bridge axis direction. Points in which the seismic reinforcement device 16 differs from the above-described seismic reinforcement device 1 are mainly a point in which an upper adjusting plate 11' is provided and a point in which a depressed portion 110' is formed in the upper adjusting plate 11'. Accordingly, other identical configurations are denoted by identical reference numerals, and the description thereof will be omitted.

As illustrated in FIG. 16, the seismic reinforcement device 16 includes the upper adjusting plate 11' in which a tapered surface (inclined surface) according to the longitudinal inclination of the steel girder G2 is formed. Similarly to the above-described upper adjusting plate 11, the upper adjusting plate 11' is a member that is interposed between the steel girder G2 and the second member 3 to level the longitudinal inclination of the steel girder G2 for horizontally installing the first member 2 and the second member 3.

The depressed portion 110' is provided on the lower surface of the upper adjusting plate 11' of the seismic reinforcement device 16 according to the embodiment. The depressed portion 110' is a depressed portion to keep a spacer 60' from coming into contact with the upper adjusting plate 11' and interfering at the time of horizontal movement so that the horizontal force sharing function of the seismic reinforcement device 16 does not become impaired.

The spacer 60' is a buffer material made of a rubber elastic body (rubber material) having a thickness of about 20 mm and can improve the substitutability of the bearing function in an emergency by increasing the thickness from that of the above-described spacer 6.

For an additional flange 4", the thickness of a part covering the second member 3 is increased from that of the above-described additional flange 4 to increase the strength that can withstand the impact when the superstructure G1 drops.

However, for the seismic reinforcement device 16, regardless of increased thicknesses of the spacer 60' and the additional flange 4", respective members of a conventional seismic reinforcement device having only the horizontal force sharing function can be directly used for other members, such as the first member 2 and the second member 3. In view of this, conventional manufacturing equipment can be directly used, and a production cost can be reduced.

With the seismic reinforcement device for a bridge 16 according to the seventh embodiment of the present invention, similarly to the seismic reinforcement device 1, since the horizontal force sharing function and the level difference preventive function can be used in combination, the seismic reinforcement device 16 can be installed with a small space, and a narrow space around a bearing can be effectively utilized to reduce an installation cost.

Further, with the seismic reinforcement device 16, the spacer 60' made of a rubber elastic body substitutes for a part of the bearing function in an emergency, such as when the superstructure G1 drops by an earthquake, the dropped upper structure can be safely supported, and also the production cost can be reduced.

While the seismic reinforcement devices for a bridge 1, 1', 1", 10, 13, 14, and 16 according to the first to seventh embodiments of the present invention have been described in detail above, any of the above-described or illustrated embodiments is merely one embodiment embodied in carrying out the present invention. Accordingly, the technical scope according to the present invention should not be construed in a limited manner by these.

In particular, the spacer according to the present invention is not limited to those of the exemplified first to seventh embodiments and may be provided between the upper adjusting plate 11 and the second member 3 illustrated in FIG. 1 and FIG. 2, between the upper adjusting plate 11 and the superstructure G1, between the first member 2 and the lower adjusting plate 12, or between the lower adjusting plate 12 and the bracket Bk and/or substructure A1. Basically, it is only necessary to provide the spacer according to the present invention between the first member 2 and the second member 3 or between the substructure A1 or the superstructure G1 and the seismic reinforcement device 1.

DESCRIPTION OF REFERENCE SIGNS

1, 1', 1", 10, 13, 14, 16: Seismic reinforcement device (Seismic reinforcement device for a bridge)
2: First member
20, 20': Baseplate
21: Projecting portion
22: Screw portion
23: Bolt hole
24: Shoulder portion
3: Second member
30: Second member main body
30a: Tapered surface
31: Depressed portion
32: Opening
33: Bolt hole
4, 4', 4": Additional flange
40, 40': Flange main body
41: Circular depressed portion
41': Circular opening
42, 42': Thread groove
5: Buffer body
50: Buffer body main body
S1: Tapered opening
6, 6', 6", 60, 60': Spacer
61, 62: Second spacer
7: Metal plate
8: Plate
9, 9': Upper bolt
11, 11': Upper adjusting plate
12: Lower adjusting plate
15: Rod
B1: Bridge
G1: Superstructure
G2: Steel girder (Superstructure)
A1: Substructure
Bk: Bracket
S1: Concrete floor slab
AB: Post-installed anchor
B2: Screw

The invention claimed is:

1. A seismic reinforcement device for a bridge to be added between a substructure and a superstructure of an already-existing bridge to increase its seismic capacity, the seismic reinforcement device comprising:
   a first member having a projecting portion; and
   a second member having a depressed portion,
   wherein:
   the projecting portion and the depressed portion are freely fitted to and engaged with one another to constitute a shear key and thereby resist a horizontal force in a state in which the first member is coupled to and supported by one of the substructure and the superstructure and the second member is coupled to and supported by the other of the substructure and the superstructure; and
   a spacer having a predetermined thickness is interposed between the first member and the second member or between the superstructure and the seismic reinforcement device such that the spacer suppresses dropping of the superstructure and reduces a level difference between the substructure and the superstructure.

2. The seismic reinforcement device according to claim 1, wherein the spacer includes a rubber elastic body in part or is a buffer material made of a rubber elastic body in whole.

3. The seismic reinforcement device according to claim 2, wherein the spacer substitutes for a part of a bearing function in an emergency.

4. The seismic reinforcement device according to claim 1, wherein the spacer is joined to an upper end of the projecting portion.

5. The seismic reinforcement device according to claim 4, wherein the first member includes a disk-shaped additional flange that covers and is secured to the upper end of the projecting portion, and the spacer is joined to an upper surface of the additional flange.

6. The seismic reinforcement device according to claim 4, wherein the spacer is mechanically fastened, adhered with an elastic adhesive, or vulcanized and adhered, to an upper end surface of the projecting portion.

7. The seismic reinforcement device according to claim 4, further comprising:
   a second spacer made of a rubber elastic body,
      wherein the first member is mounted via the second spacer, and the second spacer substitutes for a part of a bearing function in an emergency.

8. The seismic reinforcement device according to claim 7, further comprising a rod that restrains a horizontal displacement of the first member.

9. The seismic reinforcement device according to claim 1, further comprising an upper adjusting plate inclined according to an inclination of the superstructure.

10. The seismic reinforcement device according to claim 9, wherein the upper adjusting plate has a lower surface in which a second depressed portion for keeping from interfering with the spacer is formed.

11. The seismic reinforcement device according to claim 5, wherein the first member includes a shoulder portion projecting out to an outside, and the shoulder portion abuts on a lower surface of the additional flange in a state where the additional flange abuts on an upper surface of the projecting portion.

12. The seismic reinforcement device according to claim 1, wherein the spacer is positioned above an upper end of the projecting portion.

13. The seismic reinforcement device according to claim 1, further comprising a buffer body provided on an outer peripheral surface of the projecting portion,
   wherein a distance between a longitudinal end of the spacer and the recessed portion is greater than a distance between a longitudinal end of the buffer body and the opening.

* * * * *